United States Patent
Teraoka et al.

(10) Patent No.: US 11,029,945 B2
(45) Date of Patent: Jun. 8, 2021

(54) ELECTRONIC DEVICE, PROGRAM UPDATE METHOD, AND NON-TRANSITORY RECORDING MEDIUM

(71) Applicants: PANASONIC CORPORATION, Osaka (JP); TOYOTA JIDOSHA KABUSHIKI KAISHA, Aichi-ken (JP)

(72) Inventors: Yumeki Teraoka, Tokyo (JP); Kazunori Watanabe, Okazaki (JP)

(73) Assignees: PANASONIC CORPORATION, Osaka (JP); TOYOTA JIDOSHA KABUSHIKI KAISHA, Aichi (JP)

(*) Notice: Subject to any disclaimer, the term of this patent is extended or adjusted under 35 U.S.C. 154(b) by 165 days.

(21) Appl. No.: 16/279,490

(22) Filed: Feb. 19, 2019

(65) Prior Publication Data
US 2019/0258477 A1 Aug. 22, 2019

(30) Foreign Application Priority Data
Feb. 20, 2018 (JP) .............................. JP2018-028247

(51) Int. Cl.
G06F 9/44 (2018.01)
G06F 8/658 (2018.01)
H04W 4/48 (2018.01)
G06F 8/71 (2018.01)

(52) U.S. Cl.
CPC ............... *G06F 8/658* (2018.02); *G06F 8/71* (2013.01); *H04W 4/48* (2018.02)

(58) Field of Classification Search
None
See application file for complete search history.

(56) References Cited

U.S. PATENT DOCUMENTS

| | | | | |
|---|---|---|---|---|
| 2002/0194582 A1* | 12/2002 | Torii | .......................... | G06F 8/65 717/171 |
| 2009/0260001 A1* | 10/2009 | Park | ...................... | H04L 41/082 717/173 |

(Continued)

FOREIGN PATENT DOCUMENTS

| | | |
|---|---|---|
| JP | 2005-157885 | 6/2005 |
| JP | 2015-041334 | 3/2015 |

(Continued)

*Primary Examiner* — Wei Y Zhen
*Assistant Examiner* — Lanny N Ung
(74) *Attorney, Agent, or Firm* — Greenblum & Bernstein, P.L.C.

(57) ABSTRACT

A storage includes a first area in which an own device program is stored and a second area in which an other device program is stored at factory shipment. A data processor executes data processing with the other device based on the own device program. A version getter gets the version of the other device program stored in the other device. When the version of the other device program got from the other device satisfies a predetermined condition, a program transmitter transmits the other device program stored in the second area to the other device to cause the other device to update the other device program stored in the other device. A program updater temporarily stores an own device update program input from outside in the second area in place of the other device program and updates the own device program stored in the first area.

12 Claims, 11 Drawing Sheets

(56) References Cited

U.S. PATENT DOCUMENTS

| | | | | |
|---|---|---|---|---|
| 2013/0219381 A1* | 8/2013 | Lovitt | ............... | G06F 8/65 |
| | | | | 717/173 |
| 2015/0331688 A1* | 11/2015 | Shimizu | ............... | G06F 8/654 |
| | | | | 717/170 |
| 2016/0210136 A1* | 7/2016 | Huang | ............... | H04L 41/082 |
| 2017/0185391 A1* | 6/2017 | Davey | ............... | G06F 8/65 |
| 2017/0242678 A1* | 8/2017 | Sangameswaran | ....... | G06F 8/65 |
| 2018/0039491 A1* | 2/2018 | Bam ba | ............... | G06F 11/00 |

FOREIGN PATENT DOCUMENTS

| | | |
|---|---|---|
| JP | 2016-143318 | 8/2016 |
| JP | 2016-200960 | 12/2016 |

* cited by examiner

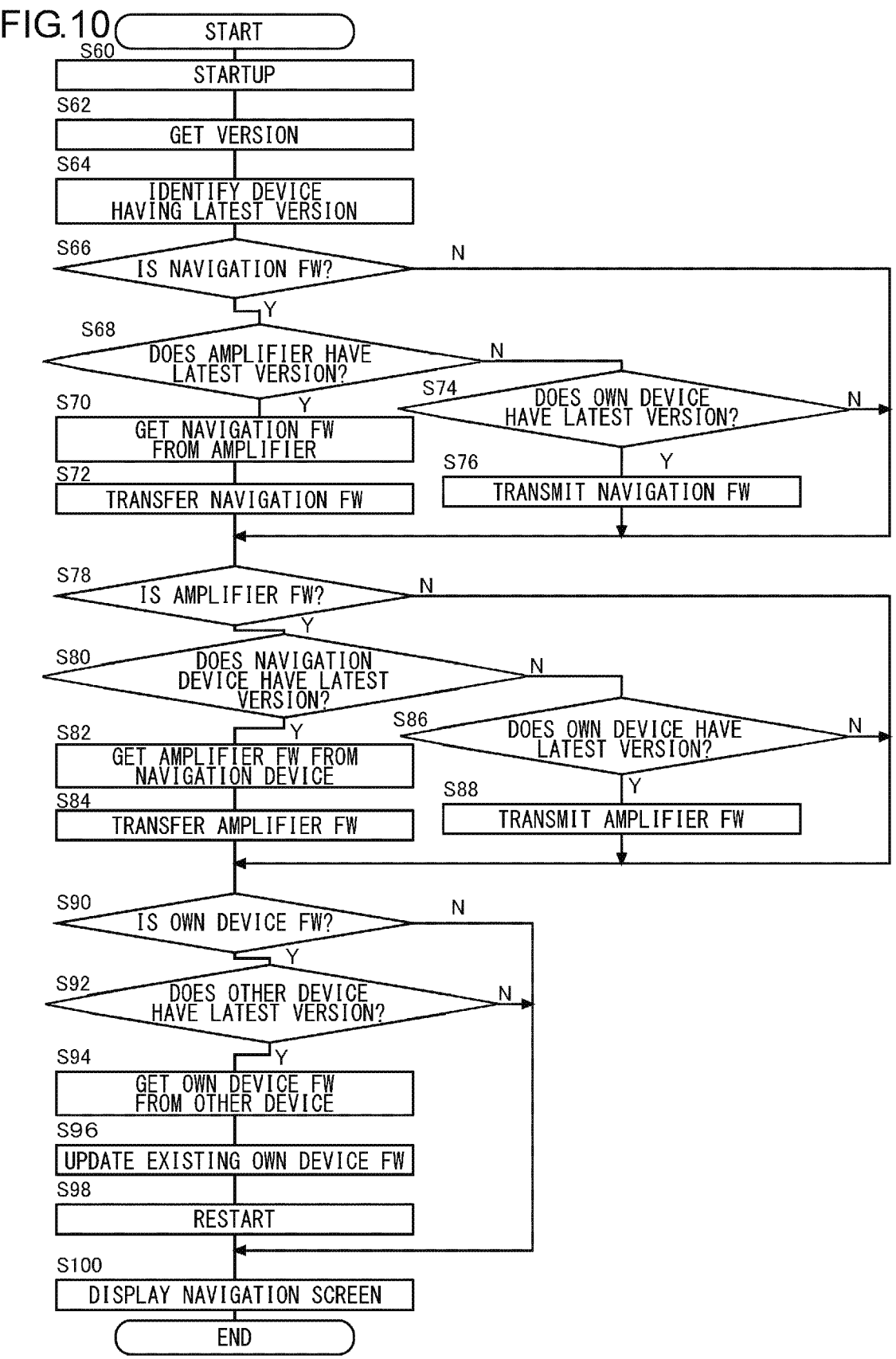

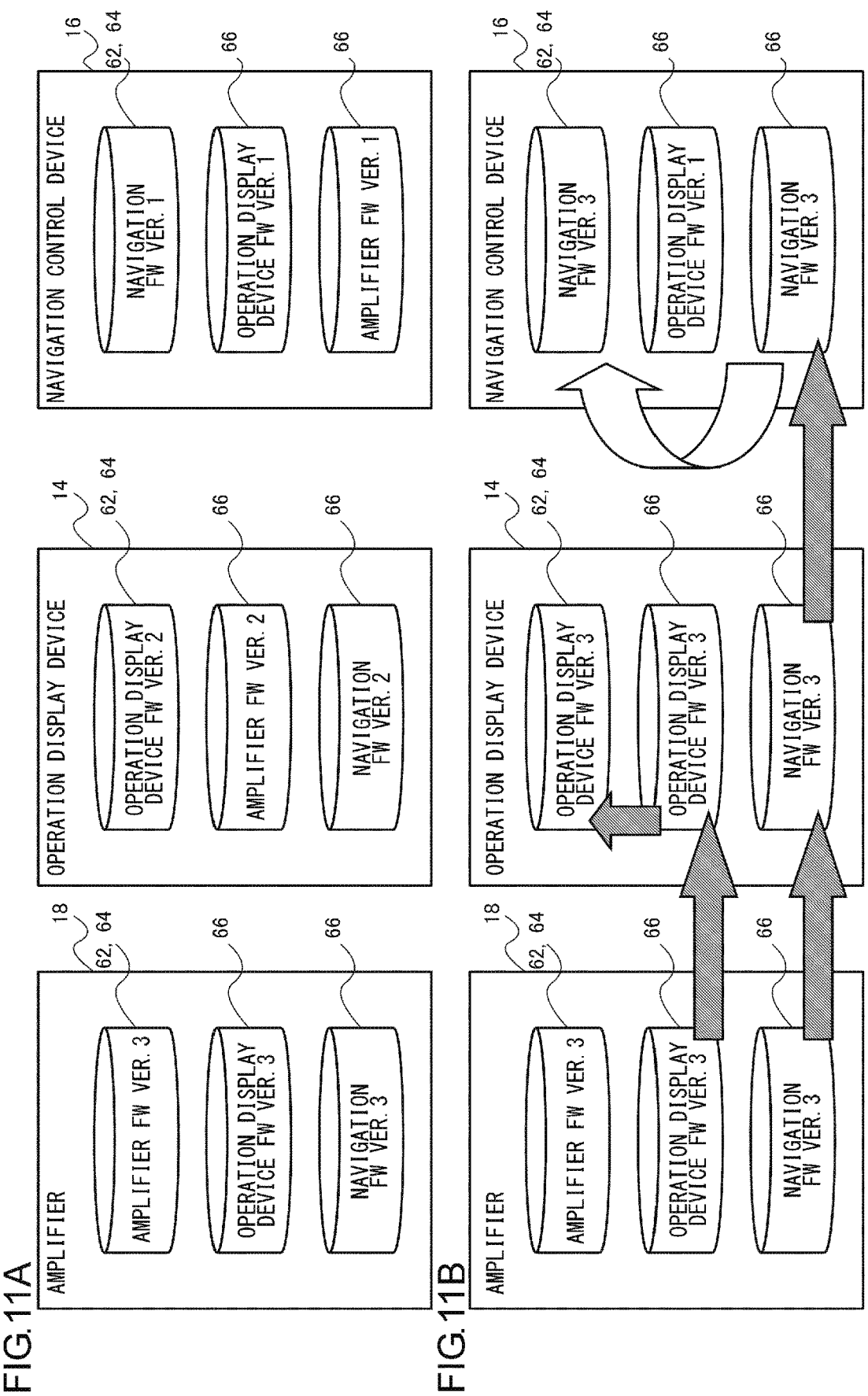

ELECTRONIC DEVICE, PROGRAM UPDATE METHOD, AND NON-TRANSITORY RECORDING MEDIUM

BACKGROUND OF THE INVENTION

1. Field of the Invention

The present disclosure relates to a data processing technique, and more particularly to an electronic device, a program update method, and a computer program.

2. Description of the Related Art

A technique is known in which when the version of firmware installed in a video relay device is older than the version of firmware requested by a basic software installed in a video generation device in a system in which the video generation device and the video relay device communicate with each other, the video generation device supplies firmware for the video relay device included in the basic software to the video relay device to update the firmware installed in the video relay device.

SUMMARY OF THE INVENTION

An object of the present disclosure is to achieve a program update among a plurality of electronic devices while suppressing an increase in memory size of the electronic devices.

An electronic device according to one aspect of the present disclosure includes a communicator, which, in operation, communicates with another device, a storage in which an own device program that is a computer program specifying an operation of the electronic device is stored in a first area in the storage, and in which another device program that is a computer program specifying an operation of the another device is stored in a second area in the storage, the second area being different from the first area, a data processor, which, in operation, executes data processing with the another device based on the own device program stored in the first area, a getter, which, in operation, receives, from the another device, version information of a device program stored in the another device, a transmitter, which, in operation, transmits the another device program stored in the second area to the another device to cause the another device to update the device program stored in the another device in response to the version information of the device program received from the another device satisfying a predetermined condition, and an updater, which, in operation, stores, in the second area in place of the another device program stored in the second area, an own device update program that is input from outside the electronic device, and updates the own device program stored in the first area using the own device update program.

Another aspect of the present disclosure is a program update method for an electronic device. This method includes executing data processing with another device, the electronic device including a storage in which an own device program that is a computer program specifying an operation of the electronic device is stored in a first area in the storage and in which another device program that is a computer program specifying an operation of another device is stored in a second area in the storage, the second area being different from the first area, the data processing with the another device being based on the own device program stored in the first area, receiving, from the another device, version information of a device program stored in the another device, transmitting the another device program stored in the second area to the another device to cause the another device to update the device program stored in the another device in response to the version information of the device program received from the another device satisfying a predetermined condition, and storing, in the second area in place of the another device program stored in the second area, an own device update program that is input from outside the electronic device, and updates the own device program stored in the first area using the own device update program.

Note that any combination of the above components and expressions of the present disclosure converted between computer programs, recording media in which computer programs are recorded, vehicles on which the above device is mounted are also effective as aspects of the present disclosure.

BRIEF DESCRIPTION OF THE DRAWINGS

FIG. 10 is a flowchart showing an operation of an operation display device according to a third embodiment; and FIGS. 11A and 11B are diagrams schematically showing an example of a program update.

DETAILED DESCRIPTION OF THE INVENTION

Figure 1:
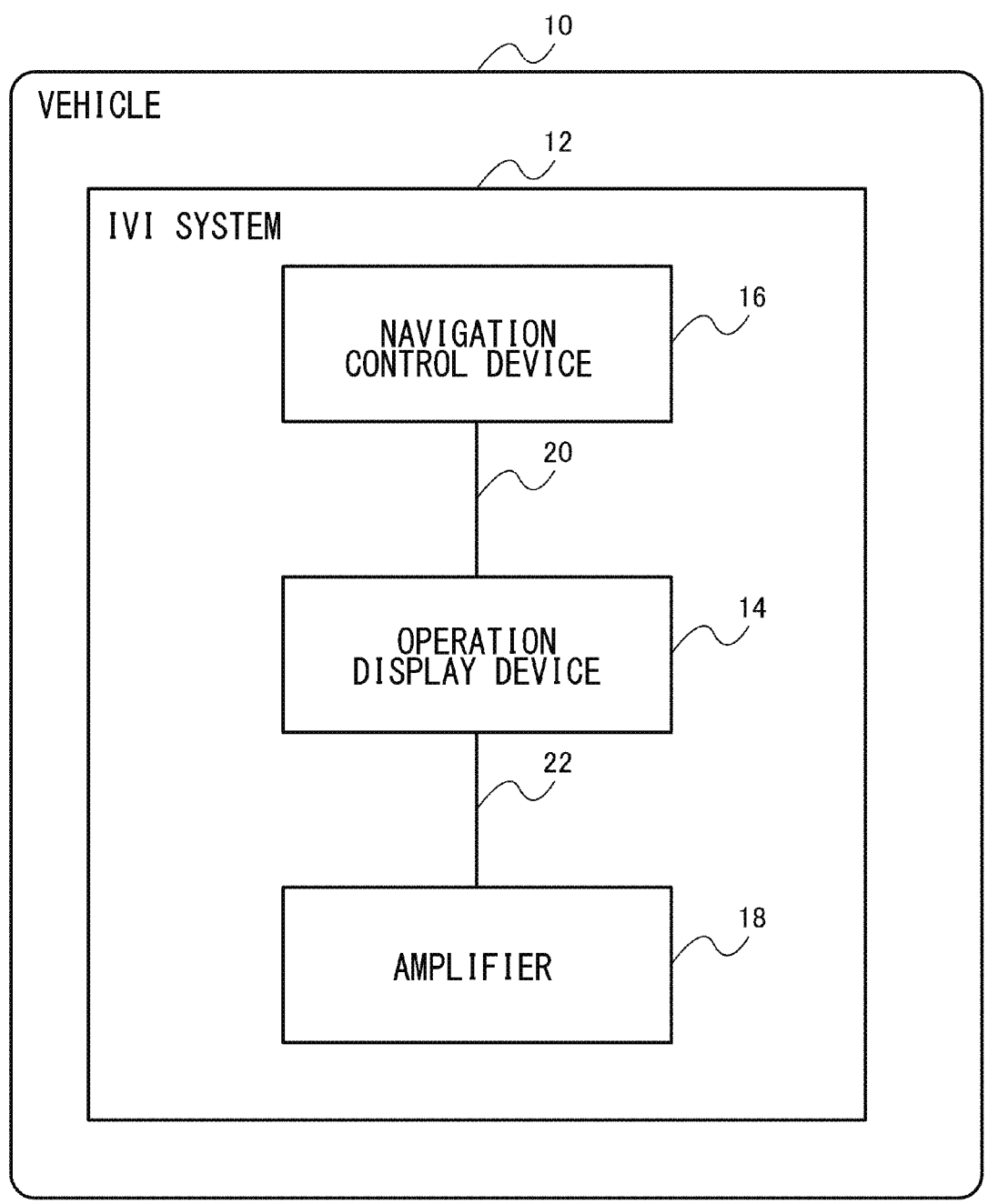
FIG. 1 is a diagram schematically showing a configuration of a vehicle according to a first embodiment.

The invention will now be described by reference to the preferred embodiments. This does not intend to limit the scope of the present invention, but to exemplify the invention.

Before describing the detailed configurations of the embodiments, an overview will be given. The current car navigation system may be implemented via cooperation among a plurality of electronic devices (electronic control units (ECUs) and the like). In such a car navigation system, bugs in software and implementation of new functions are managed based on versions, and when electronic devices of different versions are connected to each other, an error is displayed.

There are hitherto existing operational problems in version control among a plurality of electronic devices. For example, when a car dealer does not have the latest firmware, the car dealer needs to order the latest firmware from a manufacturer and do work such as an update on the existing firmware in an electronic device, which makes a customer wait. Further, when a plurality of electronic devices of different versions are connected to each other on an inspection line of a vehicle factory due to, for example, the fact that suppliers of the plurality of electronic devices are different from each other, an error is displayed and the electronic devices are determined as defective.

The technique described in JP 2016-200960 A achieves an automatic firmware update among a plurality of electronic devices. However, applying the technique to an electronic device mounted on a vehicle (hereinafter, also referred to as "in-vehicle device") causes several problems.

Problem 1: When an in-vehicle device A has firmware for an in-vehicle device B stored therein, it is necessary to reserve an area for storing the firmware for the in-vehicle device B in the in-vehicle device A, which leads to an increase in cost of the in-vehicle device A.

Problem 2: The image generation device described in JP 2016-200960 A automatically updates the firmware of the image relay device upon the head-mounted display connected to the video relay device being turned on. However, the firmware update on the in-vehicle device may take 20 to 30 minutes. Accordingly, when firmware update processing is initiated upon power being supplied to a vehicle on an inspection line of a factory, a large delay is caused in the process of the inspection line.

Problem 3: The firmware update involves a major change or a minor change. The minor change eliminates the need for making versions identical to each other among the in-vehicle devices. However, according to the technique described in JP 2016-200960 A, program update processing is executed even with such a minor change. As a result, update processing unnecessary for the inspection line of the factory may be executed, which causes work, inspection, and the like using the in-vehicle device to be delayed during the update processing.

Problem 4: A plurality of in-vehicle devices may be connected to each other via a plurality of communication paths. However, the technique described in JP 2016-200960 A is not designed to allow firmware update among the plurality of in-vehicle devices connected to each other via the plurality of communication paths.

Hereinafter, in-vehicle infotainment (IVI) systems according to the first to third embodiments for solving the above problems will be described. In each of the IVI systems according to the first to third embodiments, firmware for a communication counterpart device is stored in a memory area that is used for a conventional firmware update (a firmware update in one device) and is free at the factory shipment, which solves the problem 1.

Further, the IVI system according to the first embodiment enables a user to control firmware update timing, which solves the problem 2. Note that the user of the embodiment may be an operator of an operation display device 14 or a person belonging to a car dealer, for example.

Further, the IVI system according to the second embodiment manages the version of firmware of each electronic device that is divided into a major version and a minor version. When the respective major versions of pieces of firmware are different among the plurality of electronic devices, the firmware update is automatically executed. On the other hand, when the respective major versions of the pieces of firmware are identical to each other, the firmware update is not executed regardless of whether the minor versions are different from or identical to each other. This solves the problem 3.

Further, in the IVI system according to the third embodiment, any one of the plurality of electronic devices is set as a master device. Then, the master device collects and manages the versions of the pieces of firmware stored in the plurality of electronic devices and controls the firmware update among the plurality of electronic devices, which solves the problem 4.

First Embodiment

FIG. 1 schematically shows a configuration of a vehicle 10 according to a first embodiment. The vehicle 10 includes an IVI system 12. The IVI system 12 has a car navigation function, an audio function, a television function, a radio function, and the like. The IVI system 12 includes an operation display device 14, a navigation control device 16, and an amplifier 18.

The plurality of devices constituting the IVI system 12 are connected to each other via a plurality of types of buses (communication paths). A high transfer rate is required for communication between the operation display device 14 and the navigation control device 16. Accordingly, the operation display device 14 and the navigation control device 16 communicate with each other via a universal serial bus (USB) 20, which is a first bus. On the other hand, encryption is required for communication between the operation display device 14 and the amplifier 18 in addition to a high transfer rate. Accordingly, the operation display device 14 and the amplifier 18 communicate with each other via a media oriented systems transport (MOST) 22, which is a second bus.

The operation display device 14 is an information processing device that provides a user interface for the IVI system 12. For example, the operation display device 14 receives an operation input made by a user and presents various images, videos, and information to the user. The navigation control device 16 is an information processing device that executes various data processing (for example, a route search) related to car navigation. The amplifier 18 amplifies an audio signal input from the operation display device 14.

Figure 2:
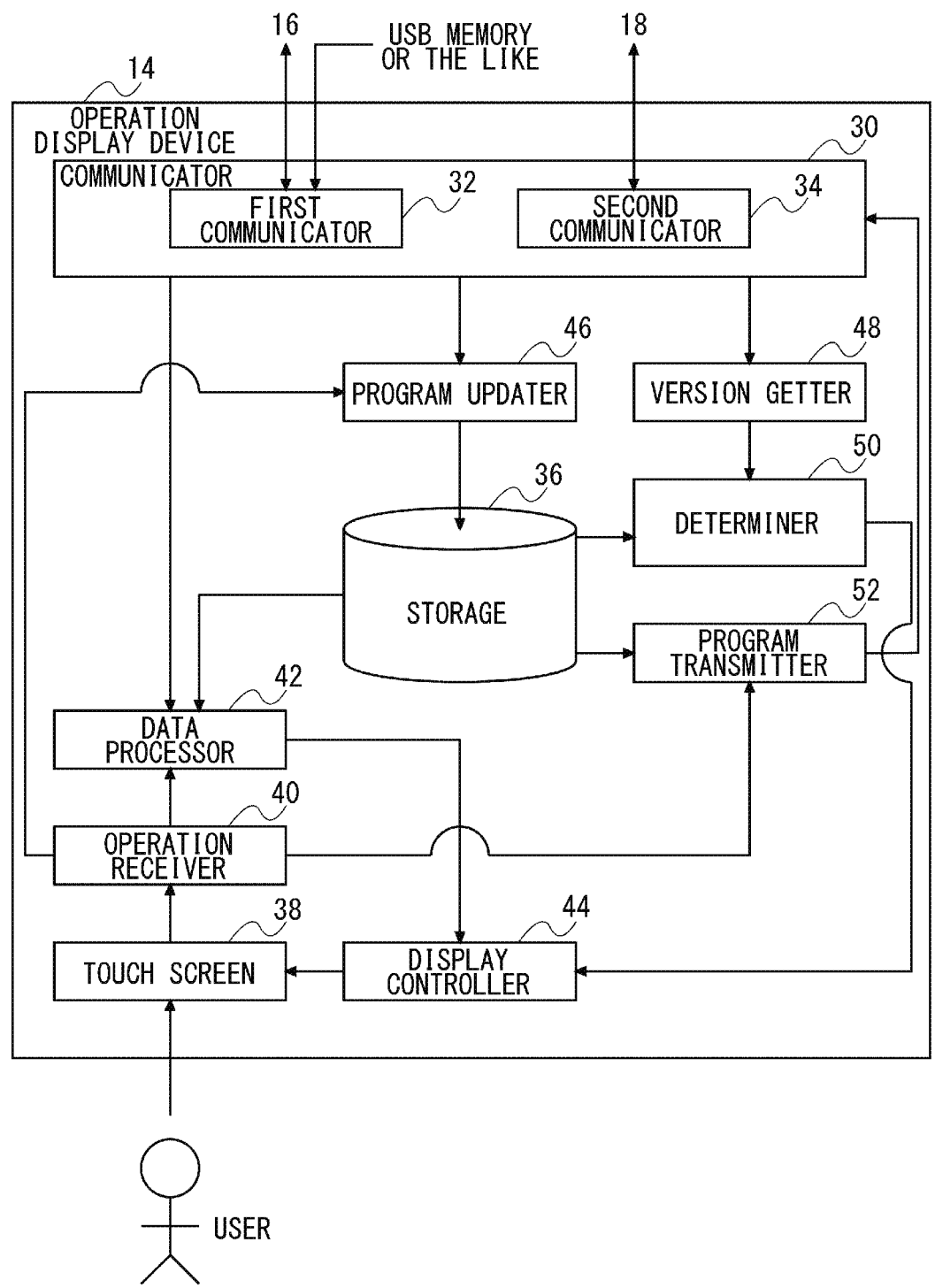
FIG. 2 is a block diagram showing a functional configuration of an operation display device according to the first embodiment.

FIG. 2 is a block diagram showing a functional configuration of the operation display device 14 in FIG. 1. The operation display device 14 includes a communicator 30, a storage 36, a touch screen 38, an operation receiver 40, a data processor 42, a display controller 44, a program updater 46, a version getter 48, a determiner 50, a program transmitter 52. The communicator 30 includes a first communicator 32 and a second communicator 34.

In terms of hardware, each block shown in the block diagram of this specification can be implemented by an element such as a CPU and memory of a computer or a mechanical device, and in terms of software, the block can be implemented by a computer program or the like. However, functional blocks each implemented via cooperation between such hardware and software are depicted herein. It is to be understood by those skilled in the art that these functional blocks can be implemented in various forms by a combination of hardware and software.

For example, a computer program including a plurality of modules corresponding to a plurality of function blocks in the operation display device 14 may be stored in a predetermined recording medium and installed in the operation display device 14 via the recording medium. Further, the computer program may be downloaded via a network and installed in the operation display device 14. A CPU of the operation display device 14 may read and execute the computer program as appropriate to enable the function of each of the functional blocks.

The first communicator 32 provides an interface with the USB 20. Another functional block of the operation display device 14 transmits and receives data to and from the navigation control device 16 via the first communicator 32. The second communicator 34 provides an interface with the MOST 22. The other functional block of the operation display device 14 transmits and receives data to and from the amplifier 18 via the second communicator 34.

Figure 3:
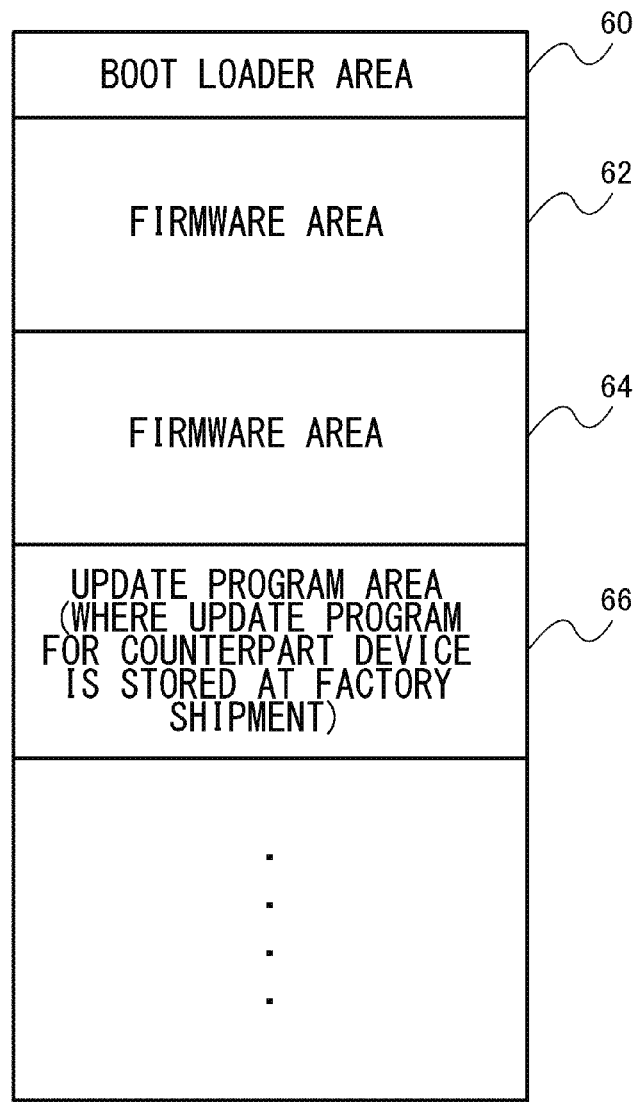
FIG. 3 is a diagram schematically showing storage areas of a storage.

The storage 36 includes storage areas for storing various pieces of data. The storage 36 may be implemented by a flash memory. FIG. 3 schematically shows storage areas of the storage 36. The storage 36 includes a boot loader area 60, a firmware area 62, a firmware area 64, and an update program area 66. The boot loader area 60 is an area for storing a boot loader.

The firmware area 62 and the firmware area 64 are areas serving as a first storage for storing firmware (own device program) that specifies an operation of its own device, and, in the operation display device 14, are areas for storing firmware that specifies an operation of the operation display device 14 (hereinafter, also referred to as "operation display device FW"). One of the firmware area 62 and the firmware area 64 is used as an active side, and the other is used as a standby side. For example, when the firmware area 62 serves as the active side and the firmware area 64 serves as the standby side, the operation display device FW stored in the firmware area 62 is executed by the CPU, and the operation display device FW stored in the firmware area 64 is to be updated.

The update program area 66 is an area for storing an update program used for updating the operation display device FW (hereinafter, also referred to as "operation display device update program"). The operation display device update program is, for example, operation display device FW newer in version than the existing operation display device FW stored in the operation display device 14. The operation display device update program read from a USB memory, another connected device, or the like at the time of software update after the vehicle 10 having the operation display device 14 mounted thereon is shipped from a factory is temporarily stored in the update program area 66 and then copied into the firmware area 62 or the firmware area 64 (standby side).

Conventionally, at the time when the vehicle 10 having the operation display device 14 mounted thereon is shipped from the factory, the update program area 66 is empty, in other words, a free area. In the operation display device 14 according to the embodiment, firmware (other device program) that specifies an operation of a counterpart device is stored in the update program area 66 at the factory shipment. The counterpart device in the first embodiment is the navigation control device 16, and firmware of the navigation control device 16 (hereinafter, also referred to as "navigation FW") is stored in the update program area 66.

In the IVI system 12, bugs in software and implementation of new functions are managed based on versions of software. The operation display device 14 stores, in the storage 36, version information of the operation display device FW stored in the firmware area 62 and the firmware area 64 of the storage 36. The operation display device FW stored in the firmware area 62 and the firmware area 64 of the storage 36 can be said to be firmware applied to its own device or firmware running on the own device. Further, when the operation display device 14 is shipped from the factory, a version of navigation FW compatible with the operation display device FW stored in the firmware area 62 and the firmware area 64 is stored in the update program area 66 of the storage 36. Version information of the navigation FW is also stored in the storage 36.

Note that a storage of the navigation control device 16 is identical in configuration to the storage 36 of the operation display device 14. That is, in the storage of the navigation control device 16, the navigation FW is stored in the firmware area 62 and the firmware area 64, and the operation display device FW is stored in the update program area 66 at the factory shipment.

Returning to FIG. 2, the operation receiver 40 detects an operation input made by the user on the touch screen 38. The data processor 42 executes various data processing peculiar to the operation display device 14 based on the operation display device FW stored in the storage 36 and the user's operation detected by the operation receiver 40. Practically, the CPU of the operation display device 14 may execute the operation display device FW to enable the function of the data processor 42.

The data processor 42 executes data processing in cooperation with the navigation control device 16 and the amplifier 18. The data processing executed by the data processor 42 includes data transmission and reception to and from the navigation control device 16 via the first communicator 32 and data transmission and reception to and from the amplifier 18 via the second communicator 34. For example, the data processor 42 may receive route information from the navigation control device 16 and generate a navigation image based on the route information.

The display controller 44 controls display contents on the touch screen 38. For example, the display controller 44 causes the touch screen 38 to display an image and video generated by the data processor 42.

The program updater 46 stores the operation display device update program input from an external device (typically a USB memory) in the update program area 66 of the storage 36. When the operation display device update program is input for the first time after the factory shipment, the program updater 46 stores the operation display device update program in the update program area 66 in place of the navigation FW stored at the factory shipment. The program updater 46 updates, based on the operation display device update program stored in the update program area 66 of the storage 36, the existing operation display device FW stored in the firmware area 62 or the firmware area 64 of the storage 36 (in other words, upgrade to a newer version of FW).

For example, when the firmware area 62 is selected as the active side and the operation display device FW in the firmware area 62 is running on the CPU, the program updater 46 updates the operation display device FW stored in the firmware area 64 serving as the standby side. The program updater 46 may replace data of the existing operation display device FW with data of the operation display device update program. After updating the operation display device FW, the program updater 46 restarts the operation display device 14 to switch between the active side and the standby side for the firmware area 62 and the firmware area 64, thereby causing the operation display device FW after the update to be executed.

The version getter 48 gets, from the other device, version information indicating the version of the other device program stored in the other device and program type information indicating the type and version of the own device program stored in the other device. In the first embodiment, the version getter 48 gets version information of the navigation FW currently applied to the navigation control device 16 from the navigation control device 16 via the first communicator 32. Further, the version getter 48 gets, from the navigation control device 16, the type of a program (typically, the operation display device FW or the navigation FW) stored in the update program area 66 of the navigation control device 16 and the program type information indicating the version of the program.

In a case where the version of the other device program got from the other device satisfies a predetermined condition, the determiner 50 and the program transmitter 52 transmit the other device program stored in the update program area 66 of the storage 36 to the other device to update the other device program to be applied to the other device. Detailed description will be given below.

The determiner 50 identifies the version indicated by the version information got by the version getter 48, that is, the version of the navigation FW applied to the navigation control device 16. Further, the determiner 50 identifies the version indicated by the program type information got by the version getter 48, that is, the version of the operation display device FW stored in the update program area 66 of the navigation control device 16. Further, the determiner 50 identifies the version of the operation display device FW stored in the firmware area 62 or the firmware area 64 (active side) of the own device, i.e. the version of the operation display device FW currently applied to the own device. Further, the determiner 50 identifies the version of the navigation FW stored in the update program area 66 of the own device.

On condition that the operation receiver 40 has received a first operation (specifically, an operation for instructing a software update screen to be displayed), the determiner 50 notifies the display controller 44 of the version of the operation display device FW and the version of navigation FW stored in the operation display device 14. At the same time, the determiner 50 notifies the display controller 44 of the version of the navigation FW and the version of the operation display device FW stored in the navigation control device 16. The determiner 50 causes the display controller 44 to execute processing of causing the touch screen 38 to display the software update screen on which the versions of the pieces of firmware stored in each of the devices are shown.

The determiner 50 compares the version of the navigation FW applied to the navigation control device 16 with the version of the navigation FW stored in the update program area 66 of the operation display device 14 to determine whether both the versions are compatible with each other (in the embodiment, whether the versions are identical to each other). Further, when the version of the navigation FW applied to the navigation control device 16 is older than the version of the navigation FW stored in the update program area 66, the determiner 50 determines that the navigation FW in the navigation control device 16 is updated to the navigation FW in the operation display device 14.

Further, when the program type information got from the navigation control device 16 indicates the operation display device FW, the determiner 50 identifies the version of the operation display device FW. The determiner 50 compares the version of the operation display device FW stored in the navigation control device 16 with the version of the operation display device FW applied to the operation display device 14 to determine whether both the versions are compatible with each other (in the embodiment, whether the versions are identical to each other). When the version of the operation display device FW applied to the operation display device 14 is older than the version of the operation display device FW stored in the navigation control device 16, the determiner 50 determines that the operation display device FW in the operation display device 14 is updated to the operation display device FW in the navigation control device 16.

When determining that the navigation FW in the navigation control device 16 is updated to the navigation FW in the operation display device 14 or determining that the operation display device FW in the operation display device 14 is updated to the operation display device FW in the navigation control device 16, the determiner 50 causes the display controller 44 to execute processing of causing the touch screen 38 to display a confirmation screen. The confirmation screen shows that the versions of the pieces of firmware are incompatible with each other and includes contents for allowing the user to confirm whether to update the firmware.

When the determiner 50 determines that the navigation FW in the navigation control device 16 is updated to the navigation FW in the operation display device 14, the program transmitter 52 transmits the navigation FW stored in the update program area 66 of the storage 36 to the navigation control device 16 on condition that the operation receiver 40 has received a second operation (specifically, an operation on the confirmation screen for instructing the firmware to be updated). That is, the program transmitter 52 provides, to the navigation control device 16, navigation FW that is newer in version than the navigation FW currently applied to the navigation control device 16, and causes the navigation control device 16 to upgrade the navigation FW to be applied to the navigation control device 16.

When a predetermined condition relating to the information on the other device program currently applied to the other device is satisfied, the program updater 46 gets the own device program held by the other device from the other device, and updates the existing own device program applied to the own device to the own device program. The update method is the same as a method in a case where update data of the own device program is input from a USB memory or the like.

Specifically, when the determiner 50 determines that the operation display device FW in the operation display device 14 is updated to the operation display device FW in the navigation control device 16, the program updater 46 gets, from the navigation control device 16, the operation display device FW stored in the navigation control device 16 on condition that the operation receiver 40 has received the second operation. The program updater 46 temporarily stores the operation display device FW got from the navigation control device 16 in the update program area 66. The program updater 46 updates the existing operation display device FW stored in the firmware area 62 or the firmware area 64 (standby side) based on the operation display device FW stored in the update program area 66.

As partially described above, the navigation control device 16 includes functional blocks corresponding to the first communicator 32, the storage 36, the data processor 42, the program updater 46, the version getter 48, the determiner 50, the program transmitter 52 of the operation display device 14. The navigation control device 16 stores the navigation FW in the firmware area 62 and the firmware area 64 of the storage 36. Further, the navigation control device 16 stores the operation display device FW in the update program area 66 of the storage 36 at the factory shipment.

Note that, in the first embodiment, both other device update processing of updating the other device program to be applied to the other device by transmitting the other device program held by the own device to the other device, and own device update processing of updating the own device program applied to the own device by getting, from the other device, the own device program held by the other device are executed on condition that the second operation (for example, an operation on the confirmation screen for instructing the firmware to be updated) is input. As a modification, the operation for instructing the other device update processing to be executed may be different from the operation for instructing the own device update processing to be executed. For example, the other device update processing may be executed on condition that a first button on the confirmation screen used for instructing the firmware of the other device to be updated is pressed, and the own device update processing may be executed on condition that a second button on the confirmation screen used for instructing the firmware of the own device to be updated is pressed.

The operation of the operation display device 14 having the above configuration will be described.

Figure 4:
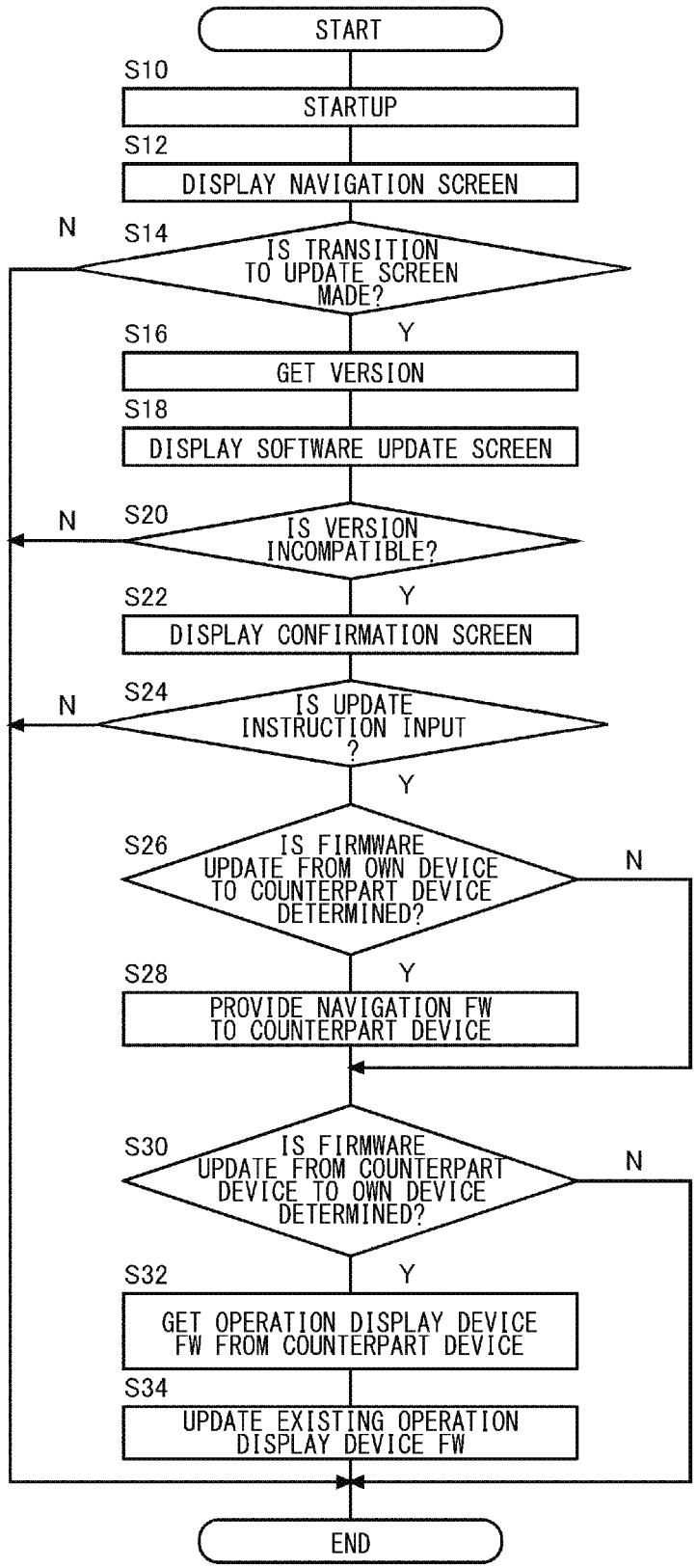
FIG. 4 is a flowchart showing an operation of the operation display device according to the first embodiment.

FIG. 4 is a flowchart showing the operation of the operation display device 14 according to the first embodiment. Here, in a car dealer, it is assumed that power is supplied to the vehicle 10 immediately after the factory shipment. When the power is supplied to the vehicle 10, the operation display device 14 (including the navigation control device 16 and the amplifier 18) is turned on (S10). The data processor 42 generates data representing a navigation screen based on the operation display device FW stored in the firmware area 62 or the firmware area 64 (active side), a user's operation input on the touch screen 38, and data received from the navigation control device 16. The display controller 44 causes the touch screen 38 to display the navigation screen (S12).

When a transition operation to the software update screen is input on the navigation screen (Y in S14), the version getter 48 gets version information and program type information of the navigation control device 16 from the navigation control device 16 (S16). The determiner 50 causes the touch screen 38 via the display controller 44 to display the software update screen indicating the version of the firmware stored in the operation display device 14 and the version of the firmware stored in the navigation control device 16 (S18).

When the version of the navigation FW applied to the navigation control device 16 is older than the version of the navigation FW stored in the operation display device 14 or the version of the operation display device FW applied to the operation display device 14 is older than the operation display device FW stored in the navigation control device 16 (Y in S20), the determiner 50 causes the touch screen 38 via the display controller 44 to display the confirmation screen (S22).

Figure 5:
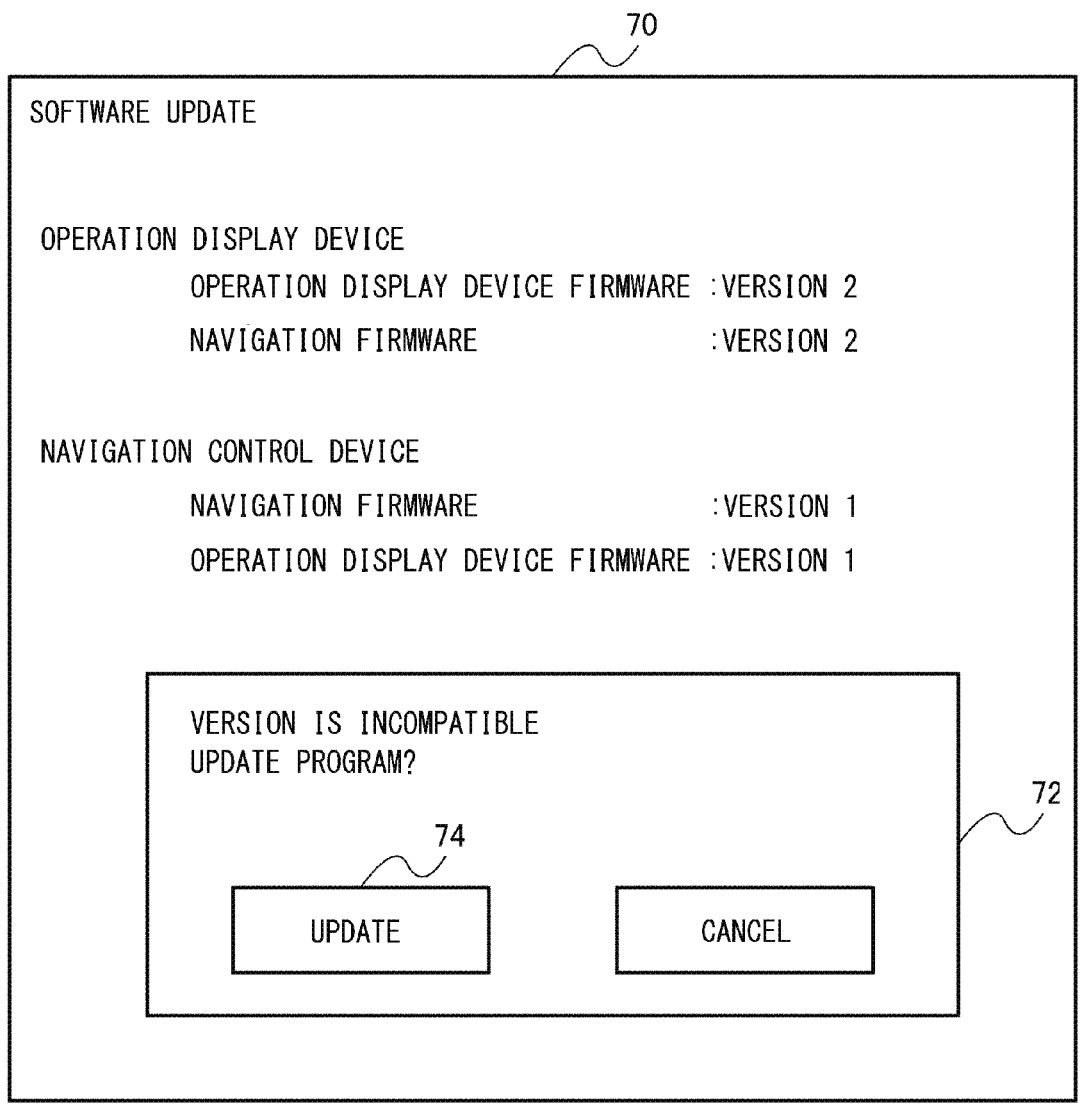
FIG. 5 is a diagram showing an example of a software update screen.

FIG. 5 shows an example of the software update screen. As described above, on a software update screen 70, the version of the operation display device FW stored in the operation display device 14 and the version of the navigation FW stored in the operation display device 14 are displayed. Further, on the software update screen 70, the version of the navigation FW stored in the navigation control device 16 and the version of the operation display device FW stored in the navigation control device 16 are displayed. When these versions are incompatible with each other, a confirmation screen 72 pops up on the software update screen 70. The confirmation screen 72 includes an update button 74 for the user to instruct the firmware to be automatically updated. When both the versions are compatible with each other, the confirmation screen 72 is not displayed. Note that, in FIG. 5, it is assumed that the versions of the operation display device FW and the navigation FW that are stored in each of the devices are identical to each other. However, the versions may be managed individually for each firmware, and the versions of the operation display device FW and the navigation FW stored in the same device may be different from each other.

Returning to FIG. 4, when a user's selection operation on the update button 74 of the confirmation screen 72 is detected (Y in S24) and determination is made that the navigation FW in the navigation control device 16 is updated to the navigation FW in the operation display device 14 (that is, when the version of the navigation FW stored in the navigation control device 16 is older than the version of the navigation FW stored in the operation display device 14) (Y in S26), the program transmitter 52 transmits data of the navigation FW stored in the update program area 66 to the navigation control device 16 (S28). As a result, the program transmitter 52 updates the navigation FW applied to the navigation control device 16 such that the version of the navigation FW is compatible with the version of the operation display device FW applied to the operation display device 14.

Figure 6A:
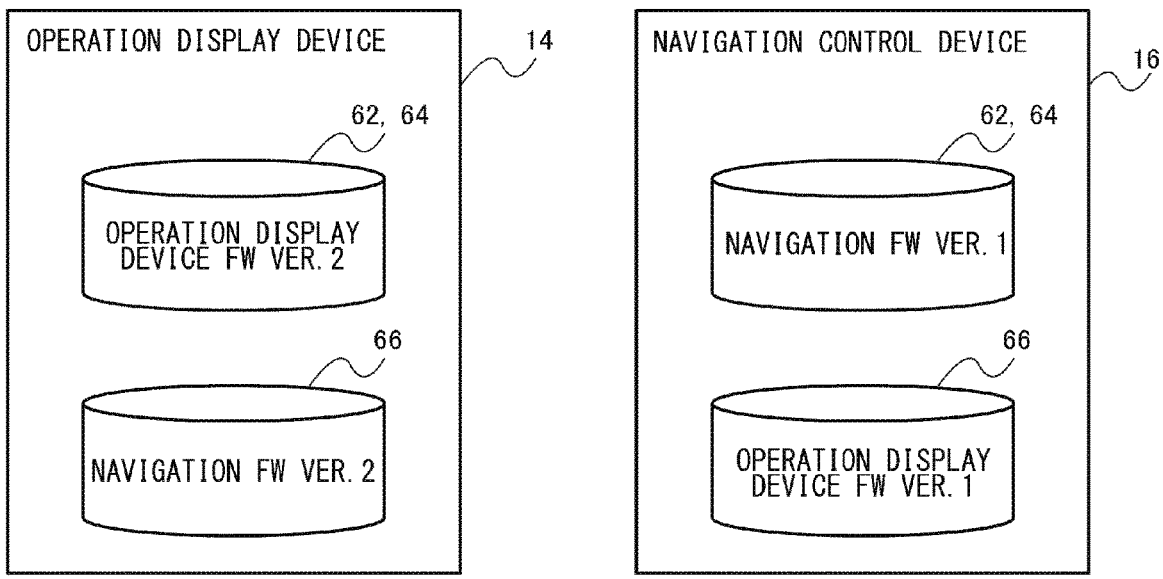
FIGS. 6A and 6B are diagrams showing an example of a program update.
Figure 6B:
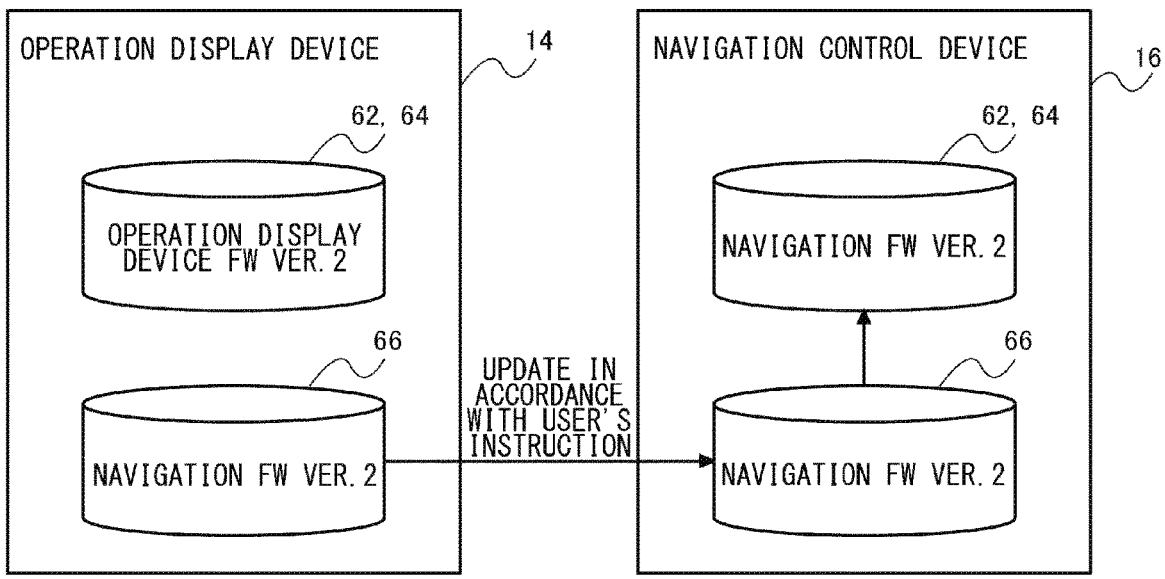

FIGS. 6A and 6B show an example of the program update. In this example, as shown in FIG. 6A, the version (version 2) of the navigation FW stored in the operation display device 14 is newer than the version (version 1) of the navigation FW stored in the navigation control device 16. Accordingly, as shown in FIG. 6B, the program transmitter 52 of the operation display device 14 transmits the navigation FW (version 2) stored in the own device to the navigation control device 16. The program updater 46 of the navigation control device 16 temporarily stores the navigation FW (version 2) in the update program area 66, and then copies the navigation FW into the firmware area 62 or the firmware area 64.

Returning to FIG. 4, when determination is made that the navigation FW in the navigation control device 16 is not updated to the navigation FW in the operation display device 14 (N in S26), S28 is skipped. When determination is made that the operation display device FW in the operation display device 14 is updated to the operation display device FW in the navigation control device 16 (that is, the version of the operation display device FW stored in the operation display device 14 is older than the version of the operation display device FW stored in the navigation control device 16) (Y in S30), the program updater 46 gets, from the navigation control device 16, the operation display device FW stored in the navigation control device 16 (S32). For example, the program transmitter 52 of the navigation control device 16 may transmit the operation display device FW prestored in the own device to the operation display device 14, and the program updater 46 of the operation display device 14 may receive the operation display device FW.

The program updater 46 updates the existing operation display device FW stored in the firmware area 62 or the firmware area 64 (standby side) based on the operation display device FW got from the navigation control device 16 (S34). As a result, the program updater 46 updates the operation display device FW applied to the operation display device 14 such that the version of the operation display device FW is compatible with the version of the navigation FW applied to the navigation control device 16. When determination is made that the operation display device FW in the operation display device 14 is not updated to the operation display device FW in the navigation control device 16 (N in S30), S32 and S34 are skipped.

When the transition operation to the software update screen is not input on the navigation screen (N in S14), the subsequent processing is skipped and the flow of this figure is terminated, and the operation display device 14 executes normal processing such as a display of a navigation image. That is, without an explicit user's operation, neither the software update screen nor an error based on version incompatibility among the plurality of electronic devices is displayed. For example, an error is prevented from being automatically displayed upon power being supplied to the vehicle 10 on an inspection line of a vehicle factory where confirmation of the software update screen is not originally required. This prevents the operation display device 14 and the navigation control device 16 from being erroneously determined as defective products, which makes it possible to reduce loss cost.

When the version of the navigation FW applied to the navigation control device 16 is newer than or identical to the version of the navigation FW stored in the operation display device 14 and the version of the operation display device FW applied to the operation display device 14 is newer than or identical to the version of the operation display device FW stored in the navigation control device 16 (N in S20), the subsequent processing is skipped and the flow of this figure is terminated. When the user's selection operation on the update button 74 of the confirmation screen 72 is not input (N in S24), the subsequent processing is skipped and the flow of this figure is terminated. That is, unless an explicit user's operation is input, the program update is not executed. This can prevent the program update from being automatically started on the inspection line of the vehicle factory to cause a delay in the process of the inspection line.

The operation display device 14 according to the first embodiment stores the firmware of the navigation control device 16 compatible with the firmware of the own device in a memory area that is a free area at the factory shipment. This eliminates the need for increasing the memory size in the operation display device 14 by a data size of the firmware of the navigation control device 16. That is, it is possible to achieve bidirectional firmware upgrades of the operation display device 14 and the navigation control device 16 while suppressing an increase in cost of the operation display device 14.

Second Embodiment

Components of an IVI system 12 according to the second embodiment are the same as the components of the IVI system 12 according to the first embodiment (FIG. 1). The IVI system 12 according to the second embodiment is different from the IVI system 12 according to the first embodiment in that the version of each device divided into a major version and a minor version is managed. Hereinafter, the contents already described in the first embodiment will be omitted as appropriate, and the points different from the first embodiment will mainly be described.

Figure 7:
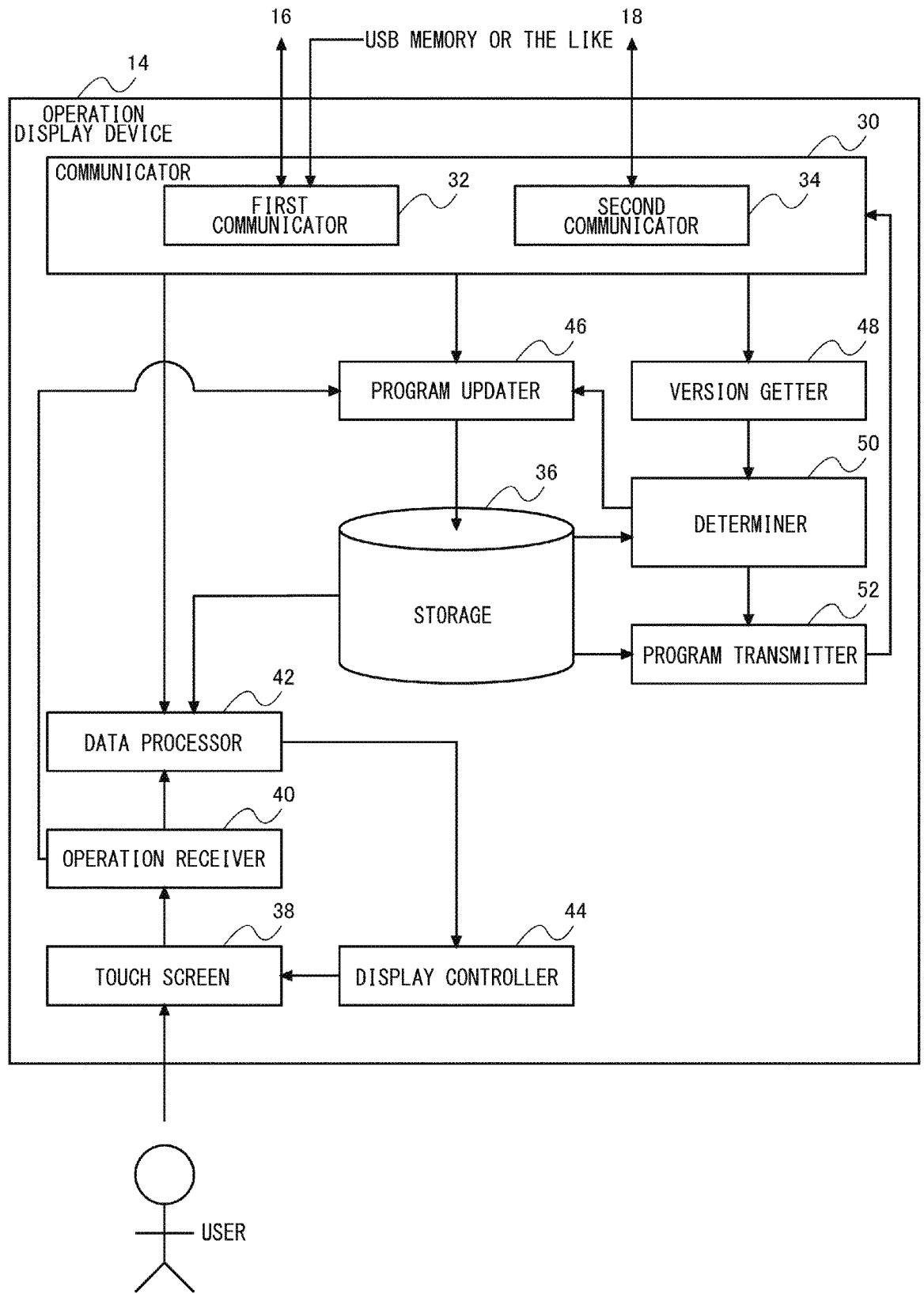
FIG. 7 is a block diagram showing a functional configuration of an operation display device according to a second embodiment.

FIG. 7 is a block diagram showing a functional configuration of the operation display device 14 according to the second embodiment. An operation display device 14 according to the second embodiment is different from the operation display device 14 according to the first embodiment in that the determiner 50, the program transmitter 52, and the program updater 46 cooperate with each other to autonomously update the firmware of the own device or the firmware of the other device. A counterpart device of the operation display device 14 according to the second embodiment is the navigation control device 16 as in the first embodiment.

The version getter 48 gets version information indicating the major version and minor version of the navigation FW applied to the navigation control device 16 from the navigation control device 16. The version getter 48 also gets version information indicating the major version and minor version of the operation display device FW stored in the update program area 66 of the navigation control device 16 from the navigation control device 16.

In the second embodiment, when a change degree of firmware is relatively large (for example, when a large-scale function addition or a large-scale bug fix has been made), the major version of the firmware is changed, and when the change degree of the firmware is relatively small, the minor version of the firmware is changed. Further, when the firmware of one electronic device is changed and the firmware of the other electronic device is changed accordingly, the major versions of the pieces of firmware of both the electronic devices are changed. For example, when the operation display device FW is changed and the navigation FW is changed accordingly, or when the navigation FW is changed and the operation display device FW is changed accordingly, the major versions of both the operation display device FW and navigation FW are incremented.

As described above, the version of the navigation FW stored in the update program area 66 of the operation display device 14 is compatible with the version of the operation display device FW stored in the firmware area 62 or the firmware area 64 (active side) of the operation display device 14. Therefore, when the major version of the navigation FW stored in the firmware area 62 or the firmware area 64 (active side) of the navigation control device 16 is older than the major version of the navigation FW stored in the update program area 66 of the operation display device 14, it is necessary to upgrade the navigation FW in the navigation control device 16 (to copy the navigation FW stored in the operation display device 14).

When the change of the firmware of one electronic device does not affect the firmware of the other electronic device, in other words, the firmware of the other electronic device need not be changed even when the firmware of one electronic device is changed, only the minor version of the firmware of the one electronic devices is changed. For example, when the operation display device FW is changed, but the navigation FW is not changed, only the minor version of the operation display device FW is incremented. Further, when the navigation FW is changed, but the operation display device FW is not changed, only the minor version of the navigation FW is incremented.

The determiner 50 reads, from the storage 36, the major version and minor version of the navigation FW stored in the update program area 66 of the operation display device 14. The determiner 50 compares the major version of the navigation FW stored in the update program area 66 with the major version of the navigation FW applied to the navigation control device 16 to determine whether both the major versions are identical to each other. When the major version of the navigation FW applied to the navigation control device 16 is older than the major version of the navigation FW stored in the update program area 66, determination is made that the navigation FW in the navigation control device 16 is updated to the navigation FW in the operation display device 14.

Further, the determiner 50 reads, from the storage 36, the major version and minor version of the operation display device FW stored in the firmware area 62 or the firmware area 64 (active side) of the operation display device 14. The determiner 50 compares the major version of the operation display device FW stored in the operation display device 14 with the major version of the operation display device FW, indicated by the version information got from the navigation control device 16, stored in the navigation control device 16 to determine whether both the major versions are identical to each other. When the major version of the operation display device FW stored in the operation display device 14 is older than the major version of the operation display device FW stored in the navigation control device 16, determination is made that the operation display device FW in the operation display device 14 is updated to the operation display device FW in the navigation control device 16.

When the determiner 50 determines that the navigation FW in the navigation control device 16 is updated to the navigation FW in the operation display device 14, the program transmitter 52 transmits the navigation FW stored in the update program area 66 of the storage 36 to the navigation control device 16 to cause the firmware applied to the navigation control device 16 to be updated. As long as the major version of the navigation FW stored in the update program area 66 of the operation display device 14 is identical to the major version of the navigation FW applied to the navigation control device 16, even when the minor version of the latter navigation FW is older than the minor version of the former navigation FW, the program transmitter 52 does not transmit the navigation FW stored in the update program area 66 to the navigation control device 16.

Further, when the determiner 50 determines that the operation display device FW in the operation display device 14 is updated to the operation display device FW in the navigation control device 16, the program updater 46 gets, from the navigation control device 16, the operation display device FW stored in the navigation control device 16 and updates the existing operation display device FW stored in the firmware area 62 or the firmware area 64 (standby side). Specifically, as in the first embodiment, the program updater 46 temporarily stores the operation display device FW got from the navigation control device 16 in the update program area 66. The program updater 46 updates the existing operation display device FW stored in the firmware area 62 or the firmware area 64 (standby side) based on the operation display device FW stored in the update program area 66.

As long as the major version of the operation display device FW stored in the navigation control device 16 is identical to the major version of the operation display device FW stored in the operation display device 14, even when the minor version of the latter operation display device FW is older than the minor version of the former operation display device FW, the program updater 46 does not update the existing operation display device FW stored in the firmware area 62 or the firmware area 64 (standby side). In this case, the program updater 46 need not get the operation display device FW from the navigation control device 16.

Figure 8:
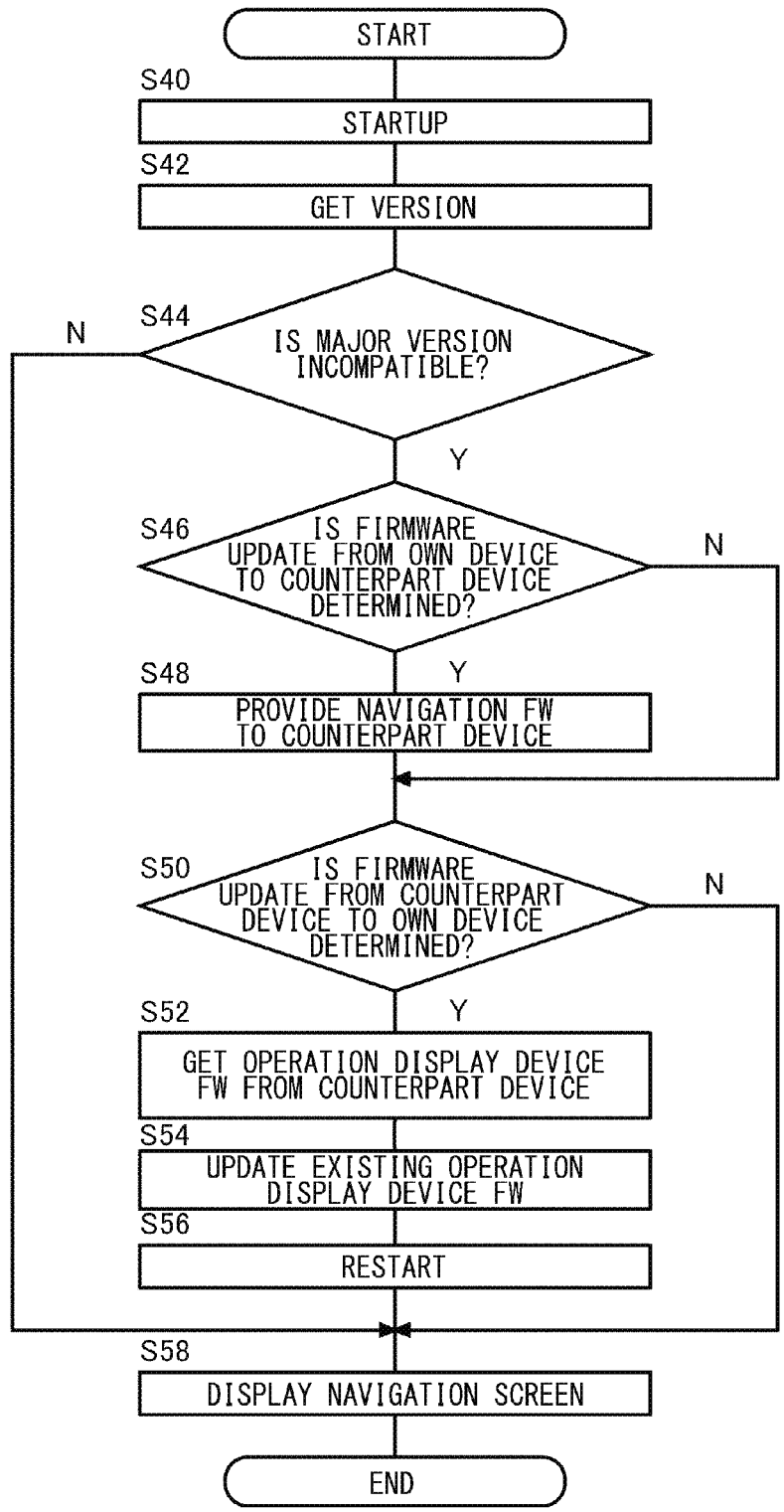
FIG. 8 is a flowchart showing an operation of the operation display device according to the second embodiment.

FIG. 8 is a flowchart showing the operation of the operation display device 14 according to the second embodiment. When the power is supplied to the vehicle 10, the operation display device 14 (including the navigation control device 16 and the amplifier 18) is turned on (S40). The version getter 48 gets version information and program type information from the navigation control device 16 (S42). When the major version of the navigation FW applied to the navigation control device 16 is not identical to the major version of the navigation FW stored in the operation display device 14 or the major version of the operation display device FW applied to the operation display device 14 is not identical to the major version of the operation display device FW stored in the navigation control device 16 (Y in S44), the determiner 50 determines that the navigation FW in the navigation control device 16 is updated to the navigation FW in the operation display device 14, and/or determines that the operation display device FW in the operation display device 14 is updated to the operation display device FW in the navigation control device 16.

When determination is made that the navigation FW in the navigation control device 16 is updated to the navigation FW in the operation display device 14 (Y in S46), the program transmitter 52 transmits data of the navigation FW stored in the update program area 66 to the navigation control device 16 (S48). When determination is made that the navigation FW in the navigation control device 16 is not updated to the navigation FW in the operation display device 14 (N in S46), S48 is skipped.

When determination is made that the operation display device FW in the operation display device 14 is updated to the operation display device FW in the navigation control device 16 (Y in S50), the program updater 46 gets, from the navigation control device 16, the operation display device FW stored in the navigation control device 16 (S52). The program updater 46 updates the existing operation display device FW stored in the firmware area 62 or the firmware area 64 (standby side) based on the operation display device FW got from the navigation control device 16 (S54). The program updater 46 restarts the operation display device 14 and then switches between the active side and the standby side for the firmware area 62 and the firmware area 64 to enable the operation display device FW thus upgraded (S56). When determination is made that the operation display device FW in the operation display device 14 is not updated to the operation display device FW in the navigation control device 16 (N in S50), S52 to S56 are skipped.

The data processor 42 generates data representing the navigation screen based on the operation display device FW stored in the firmware area 62 or the firmware area 64 (active side). The display controller 44 causes the touch screen 38 to display the navigation screen (S58).

When the major version of the navigation FW applied to the navigation control device 16 is identical to the major version of the navigation FW stored in the operation display device 14 and the major version of the operation display device FW applied to the operation display device 14 is identical to the major version of the operation display device FW stored in the navigation control device 16 (N in S44), the flow proceeds to S58 and a normal navigation screen is displayed regardless of whether the minor versions of the pieces of navigation FW are different from or identical to each other and the minor versions of the pieces of operation display device FW are different from or identical to each other. Unnecessary firmware update processing is skipped as described above, which makes it possible to prevent the user from waiting for a time required for the firmware update processing (for example, 20 minutes to 30 minutes).

Figure 9A:
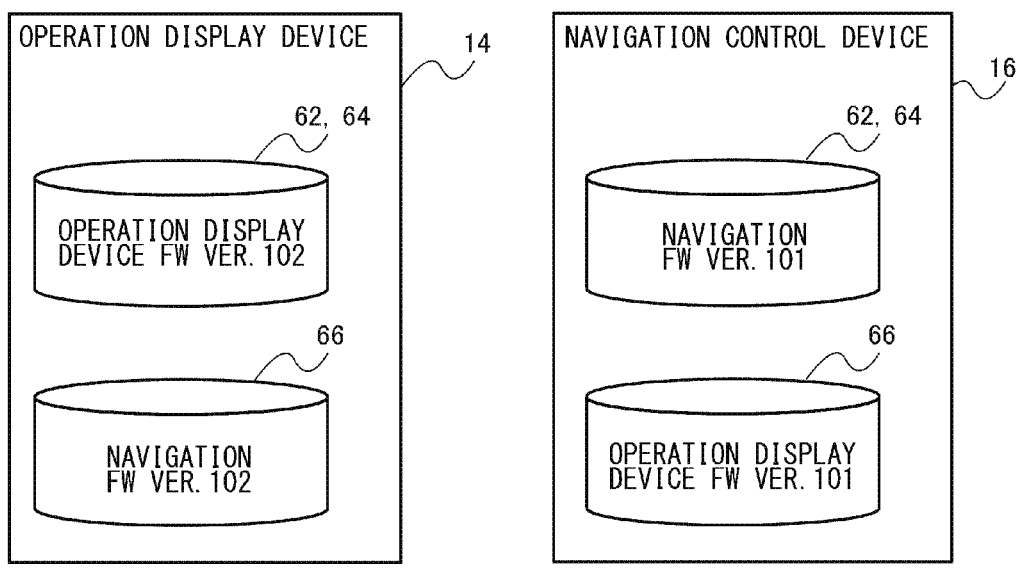
FIGS. 9A, 9B, and 9C are diagrams showing an example of a program update.
Figure 9B:
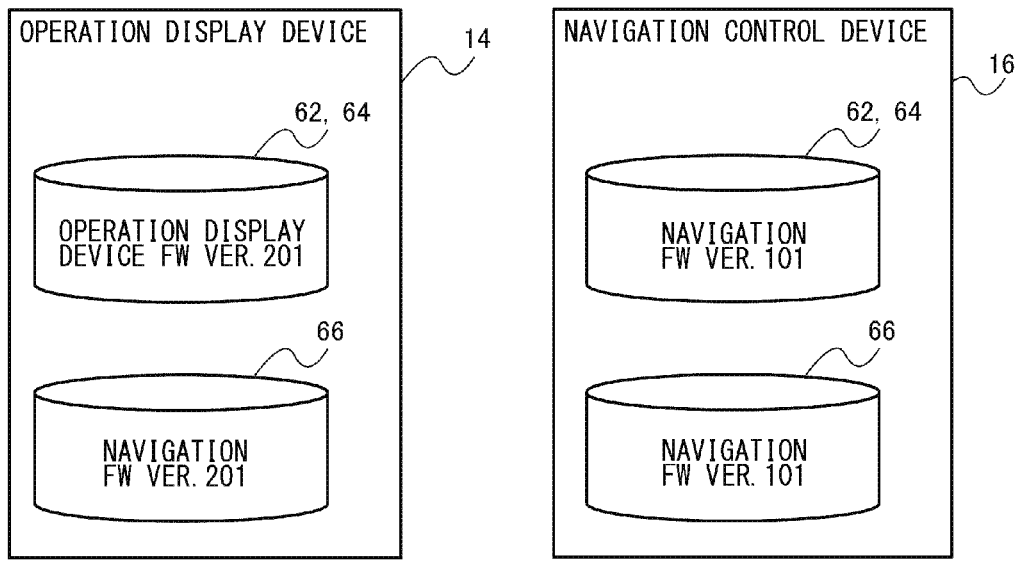
Figure 9C:
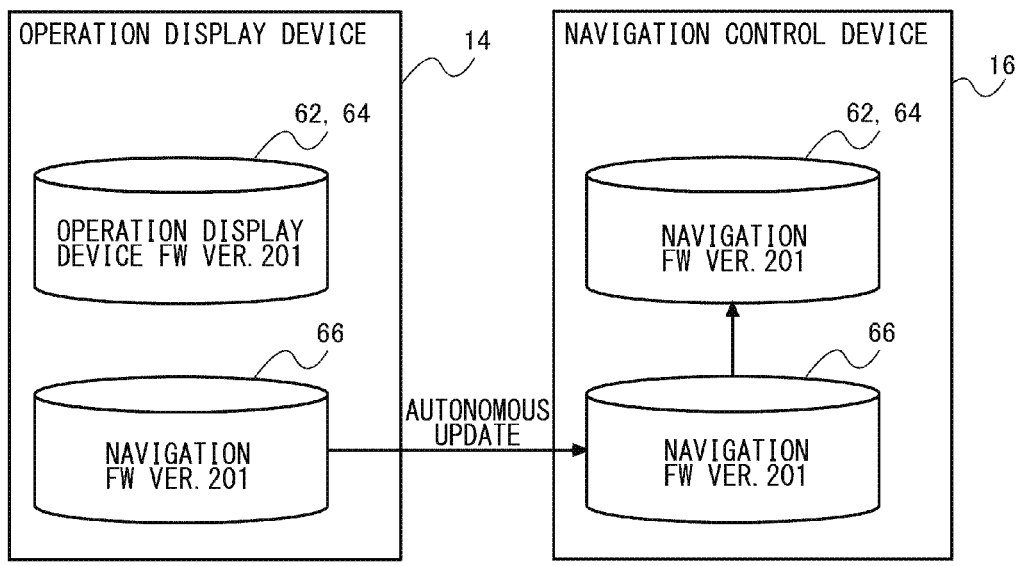

FIGS. 9A, 9B, and 9C show an example of the program update. In this example, the third digit of the version is taken as the major version, and the second digit and the first digit are taken as the minor version. In FIG. 9A, the firmware stored in the operation display device 14 and the firmware stored in the navigation control device 16 are identical in the major version to but different in the minor version from each other. In this case, the firmware is not automatically updated.

On the other hand, in FIG. 9B, the firmware stored in the operation display device 14 and the firmware stored in the navigation control device 16 are different from each other in the major version. Therefore, as shown in FIG. 9C, the program transmitter 52 of the operation display device 14 transmits the navigation FW (version 201) stored in the own device to the navigation control device 16. The program updater 46 of the navigation control device 16 temporarily stores the navigation FW (version 201) in the update program area 66 and then copies the navigation FW into the firmware area 62 or the firmware area 64.

Third Embodiment

Components of an IVI system 12 according to the third embodiment are the same as the components of the IVI system 12 according to the first embodiment (FIG. 1). The IVI system 12 according to the third embodiment is different from the IVI system 12 according to the first embodiment in that the firmware is updated among a plurality of electronic devices connected via a plurality of types of buses. In the third embodiment, electronic devices having firmware to be updated include the operation display device 14, the navigation control device 16, and the amplifier 18. Hereinafter, the contents already described in the first embodiment will be omitted as appropriate, and the points different from the first embodiment will mainly be described.

As described above, the IVI system 12 communicates with the navigation control device 16 via the USB 20 and communicates with the amplifier 18 via the MOST 22. In the IVI system 12 according to the third embodiment, the operation display device 14 connected to both the USB 20 and the MOST 22 serves as a master device to collectively manage the firmware update of each of the devices constituting the IVI system 12. As a modification, a device other than the operation display device 14 may serve as the master device. Functional blocks of the operation display device 14 according to the third embodiment are the same as the functional blocks of the operation display device 14 according to the second embodiment (FIG. 7).

At least at the factory shipment of the operation display device 14, firmware that specifies the operation of the navigation control device 16 (that is, the navigation FW) and firmware that specifies the operation of the amplifier 18 (hereinafter, referred to as "amplifier FW") are stored in the update program area 66 of the storage 36. Similarly, the operation display device FW and the amplifier FW are stored in the update program area 66 of navigation control device 16 at the factory shipment. Further, the operation display device FW and the navigation FW are stored in the update program area 66 of the amplifier 18 at the factory shipment.

Hereinafter, the function of the operation display device 14 serving as the master device will be described. The version getter 48 gets, from the navigation control device 16, respective pieces of version information of the operation display device FW, the navigation FW, and the amplifier FW stored in the navigation control device 16. Further, the version getter 48 gets, from the amplifier 18, respective pieces of version information of the operation display device FW, the navigation FW, and the amplifier FW stored in the amplifier 18.

The determiner 50 determines whether the version of the operation display device FW stored in the operation display device 14, the version of the operation display device FW stored in the navigation control device 16, the version of the amplifier FW stored in the amplifier 18 are different from or identical to each other. The determiner 50 determines a device having the latest version of operation display device FW stored therein among the operation display device 14, the navigation control device 16, and the amplifier 18 as a provider of an update program for the operation display device FW.

Further, the determiner 50 determines whether the version of the navigation FW stored in the operation display device 14, the version of the navigation FW stored in the navigation control device 16, and the version of the navigation FW stored in the amplifier 18 are different from or identical to each other. The determiner 50 determines a device having the latest version of navigation FW stored therein among the operation display device 14, the navigation control device 16, and the amplifier 18 as a provider of an update program for the navigation FW.

Further, the determiner 50 determines whether the version of the amplifier FW stored in the operation display device 14, the version of the amplifier FW stored in the navigation control device 16, and the version of the amplifier FW stored in the amplifier 18 are different from or identical to each other. The determiner 50 determines a device having the latest version of amplifier FW stored therein among the operation display device 14, the navigation control device 16, and the amplifier 18 as a provider of an update program for the amplifier FW.

The program updater 46 and the program transmitter 52 of the operation display device 14 execute processing of copying the latest version of firmware from the device serving as the provider of the update program determined by the determiner 50 to the other devices for each of the operation display device FW, the navigation FW, and the amplifier FW.

FIG. 10 is a flowchart showing the operation of the operation display device 14 according to the third embodiment. When the power is supplied to the vehicle 10, the operation display device 14 (including the navigation control device 16 and the amplifier 18) is turned on (S60). The version getter 48 gets, from the navigation control device 16, the version information of each firmware stored in the navigation control device 16 and gets, from the amplifier 18, the version information of each firmware stored in the amplifier 18 (S62). The determiner 50 identifies a device having the latest version of each of the operation display device FW, the navigation FW, and the amplifier FW stored therein (S64).

When it is update timing of the navigation FW (for example, at startup or when an explicit update instruction has been received) (Y in S66) and the amplifier 18 has the latest version of navigation FW stored therein (Y in S68), the program updater 46 of the operation display device 14 gets the navigation FW from the amplifier 18 (S70). The program transmitter 52 transfers the navigation FW thus got to the navigation control device 16 (S72). When the operation display device 14 has the latest version of navigation FW stored therein (N in S68) (Y in S74), the program transmitter 52 transmits the navigation FW stored in the update program area 66 of the own device to the navigation control device 16 (S76). When the navigation control device 16 has the latest version of navigation FW stored therein, that is, the latest version of navigation FW is currently applied to the navigation control device 16 (N in S74), the update processing of the navigation FW is terminated. When it is not the update timing of the navigation FW (N in S66), S68 to S76 are skipped.

When it is the update timing of the amplifier FW (Y in S78) and the navigation control device 16 has the latest version of amplifier FW stored therein (Y in S80), the program updater 46 of the operation display device 14 gets the amplifier FW from the navigation control device 16 (S82). The program transmitter 52 transfers the amplifier FW thus got to the amplifier 18 (S84). When the operation display device 14 has the latest version of amplifier FW stored therein (N in S80) (Y in S86), the program transmitter 52 transmits the amplifier FW stored in the update program area 66 of the own device to the amplifier 18 (S88). When the amplifier 18 has the latest version of amplifier FW stored therein, that is, the latest version of amplifier FW is currently applied to the amplifier 18 (N in S86), the update processing of the amplifier FW is terminated. When it is not the update timing of the amplifier FW (N in S78), S80 to S88 are skipped.

When it is update timing of the operation display device FW (Y in S90) and the navigation control device 16 or the amplifier 18 has the latest version of operation display device FW stored therein (Y in S92), the program updater 46 of the operation display device 14 gets the latest version of operation display device FW from the navigation control device 16 or the amplifier 18 (S94). The program updater 46 upgrades, based on the operation display device FW thus got, the existing operation display device FW stored in the own device (S96) and restarts the own device (S98). Thereafter, the data processor 42 generates and displays the navigation screen based on the operation display device FW thus upgraded (S100). When the operation display device 14 has the latest version of operation display device FW stored therein, that is, the latest version of operation display device FW is currently applied to the own device (N in S92), the update processing of the operation display device FW is terminated. When it is not the update timing of the operation display device FW (N in S90), S92 to S98 are skipped.

FIGS. 11A and 11B show an example of the program update. As shown in FIG. 11A, in this example, the version (version 3) of the firmware stored in the amplifier 18 is newer than the version (version 2) of the firmware stored in the operation display device 14 and the version (version 1) of the firmware stored in the navigation control device 16. Therefore, the determiner 50 of the operation display device 14 serving as the master device determines the amplifier 18 as the provider of the update program for each firmware.

As shown in FIG. 11B, the program updater 46 of the operation display device 14 gets, from the amplifier 18, the operation display device FW (version 3) and the navigation FW (version 3) stored in the amplifier 18 and temporarily stores the operation display device FW and the navigation FW in the update program area 66. Practically, the program transmitter 52 of the amplifier 18 may autonomously transmit the operation display device FW (version 3) and the navigation FW (version 3) to the operation display device 14, and the program updater 46 of the operation display device 14 may receive both the operation display device FW and the navigation FW.

The program updater 46 of the operation display device 14 copies the operation display device FW (version 3) into the firmware area 62 or the firmware area 64. The program transmitter 52 of the operation display device 14 transmits the navigation FW (version 3) to the navigation control device 16. The program updater 46 of the navigation control device 16 temporarily stores the navigation FW (version 3) in the update program area 66, and then copies the navigation FW into the firmware area 62 or the firmware area 64.

Most vehicles are provided with a plurality of types of buses (communication paths) having different features, and a plurality of in-vehicle devices are each connected to a bus that is suitable for the nature and the like of data to be processed. The use of the operation display device 14 according to the third embodiment allows a system in which a plurality of in-vehicle devices cooperate with each other via different types of buses to autonomously update the firmware. Note that, as described in the third embodiment, it is effective to cause the operation display device 14 connected to any of a plurality of types of buses to be set as the master device, and to collect the versions of the plurality of in-vehicle devices and execute processing of controlling the firmware update among the plurality of in-vehicle devices.

The present disclosure has been described above based on the first to third embodiments. It is to be understood by those skilled in the art that these embodiments are illustrative and that various modifications are possible for a combination of components or processes, and that such modifications are also within the scope of the present disclosure.

A first modification will be described. Although the operation display device 14 according to the second embodiment autonomously executes the program update independently of the user's operation, the technique according to the first embodiment may be applied to the operation display device 14 as a modification to cause the operation display device 14 to execute the program update in accordance with the user's operation. For example, when the operation for instructing the software update screen 70 to be displayed is input, the determiner 50 may cause the software update screen 70 to be displayed on which the major version and minor version of the operation display device FW currently applied to the operation display device 14 and the major version and minor version of the navigation FW currently applied to the navigation control device 16 are shown.

When the major version of the operation display device FW currently applied to the operation display device 14 is older than the major version of the operation display device FW stored in the navigation control device 16 or the major version of the navigation FW currently applied to the navigation control device 16 is older than the major version of the navigation FW stored in the operation display device 14, the determiner 50 may cause the confirmation screen 72 to be displayed. Then, when an operation on the confirmation screen 72 for instructing the program update to be executed is input, the operation display device FW stored in the operation display device 14 or the navigation FW stored in the navigation control device 16 may be updated.

A second modification will be described. Although the operation display device 14 according to the third embodiment autonomously executes the program update independently of the user's operation, the technique according to the first embodiment may be applied to the operation display device 14 as a modification to cause the operation display device 14 to execute the program update in accordance with the user's operation. For example, when the operation for instructing the software update screen 70 to be displayed is input, the determiner 50 may cause the software update screen 70 to be displayed on which the version of the operation display device FW currently applied to the operation display device 14, the version the navigation FW currently applied to the navigation control device 16, and the version of the amplifier FW currently applied to the amplifier 18 are shown.

When at least one of the conditions where the latest version of operation display device FW is stored in a device other than the operation display device 14, the latest version of navigation FW is stored in a device other than the navigation control device 16, and the latest version of amplifier FW is stored in a device other than the amplifier 18 is satisfied, the determiner 50 may cause the confirmation screen 72 to be displayed. Then, when the operation on the confirmation screen 72 for instructing the program update to be executed is input, the operation display device 14 (that is, the master device) may execute at least one of processing of applying the latest version of operation display device FW to the operation display device 14, processing of applying the latest version of navigation FW to the navigation control device 16, and processing of applying the latest version of amplifier FW to the amplifier 18.

A third modification will be described. The technique according to the second embodiment may be applied to the operation display device 14 according to the third embodiment. For example, the determiner 50 of the operation display device 14 may determine whether the respective major versions of the pieces of firmware stored in the operation display device 14, the navigation control device 16, and the amplifier 18 are different from or identical to each other. When the respective major versions of the pieces of firmware stored in the devices are different from each other, the determiner 50 of the operation display device 14 may determine a device having the latest major version of firmware stored therein as the provider of the update program.

A fourth modification will be described. The technique according to the second embodiment and the technique according to the third embodiment may be applied to the operation display device 14 according to the first embodiment. For example, when the operation for instructing the software update screen 70 to be displayed is input, the determiner 50 may cause the software update screen 70 to be displayed on which the major version and minor version of the operation display device FW currently applied to the operation display device 14, the major version and minor version of the navigation FW currently applied to the navigation control device 16, and the major version and minor version of the amplifier FW currently applied to the amplifier 18 are shown.

When the respective major versions of the pieces of operation display device FW stored in the operation display device 14, the navigation control device 16, and the amplifier 18 are different from each other, the respective major versions of the pieces of navigation FW stored in the operation display device 14, the navigation control device 16, and the amplifier 18 are different from each other, or the respective major versions of the pieces of amplifier FW stored in the operation display device 14, the navigation control device 16, and the amplifier 18 are different from each other, the determiner 50 may cause the confirmation screen 72 to be displayed. Then, when the operation on the confirmation screen 72 for instructing the program update to be executed is input, the latest version of operation display device FW may be applied to the operation display device 14, the latest version of navigation FW may be applied to the navigation control device 16, or the latest version of amplifier FW may be applied to the amplifier 18.

A fifth modification applicable to the first to third embodiments will be described. Although not mentioned in each of the embodiments, after updating the navigation FW of the navigation control device 16, the program transmitter 52 of the operation display device 14 may transmit the operation display device FW currently applied to the own device to the navigation control device 16 to cause the operation display device FW to be stored in the update program area 66 of the navigation control device 16. For example, in FIGS. 6A and 6B, after updating the navigation FW in the firmware area 62 or the firmware area 64 of the navigation control device 16, the operation display device 14 may transmit the operation display device FW (version 2) to the navigation control device 16 to cause the operation display device FW to be stored in the update program area 66.

Similarly, in FIGS. 9A to 9C, after updating the navigation FW in the firmware area 62 or the firmware area 64 of the navigation control device 16, the operation display device 14 may transmit the operation display device FW (version 201) to the navigation control device 16 to cause the operation display device FW to be stored in the update program area 66. Similarly, in FIGS. 11A and 11B, after updating the operation display device FW of the operation display device 14 and updating the navigation FW of the navigation control device 16, the amplifier FW (version 3) currently applied to the amplifier 18 may be stored in the update program area 66 of the operation display device 14 and in the update program area 66 of the navigation control device 16.

The configuration according to the fifth modification allows, upon the completion of the firmware update, a newer version of other device firmware to be stored in the update program area 66 of each of the electronic devices constituting the IVI system 12. This enables each of the electronic devices to provide, when the electronic device is newly connected to another electronic device, the newer version of firmware to the other electronic device.

A sixth modification applicable to the first to third embodiments will be described. In each of the devices constituting the IVI system 12, the version of the own device program stored in the firmware area 62 (or the firmware area 64) of the storage 36 and the version of the other device program stored in the update program area 66 may be identical to each other at the factory shipment. Note that at least the major versions may be identical to each other. In this modification, the same version is assigned to the own device program (for example, the operation display device FW) and the other device program (for example, the navigation FW) that are compatible with each other. This aspect simplifies the firmware version comparison between the devices, thereby making the firmware update more efficient.

The program update techniques described in the above embodiments and modifications are applicable to not only in-vehicle devices, but also various electronic devices that execute data processing in cooperation with other devices. In particular, the program update techniques described in the above embodiments and modifications are suitable for electronic devices having a difficulty in increasing the memory size for cost or technical reasons.

Note that the techniques described in the embodiments and modifications may be identified by the following items.

[Item 1]

An electronic device including a communicator, which, in operation, communicates with another device, a storage in which an own device program that is a computer program specifying an operation of the electronic device is stored in a first area in the storage, and in which another device program that is a computer program specifying an operation of the another device is stored in a second area in the storage, the second area being different from the first area, a data processor, which, in operation, executes data processing with the another device based on the own device program stored in the first area, a getter, which, in operation, receives, from the another device, version information of a device program stored in the another device, a transmitter, which, in operation, transmits the another device program stored in the second area to the another device to cause the another device to update the device program stored in the another device in response to the version information of the device program received from the another device satisfying a predetermined condition, and an updater, which, in operation, stores, in the second area in place of the another device program stored in the second area, an own device update program that is input from outside the electronic device, and updates the own device program stored in the first area using the own device update program.

The configuration of this electronic device eliminates the need for additionally providing a memory area for storing the other device program, which makes it possible to suppress an increase in the manufacturing cost of the electronic device.

[Item 2]

The electronic device according to item 1 further including a display controller, which, in operation, displays version information indicating a version of the another device program stored in the second area and a version of the device program received from the another device on condition that an operator inputs a first operation, wherein in response to the version of the device program received from the another device being older than the version of the another device program stored in the second area, the transmitter transmits the another device program stored in the second area to the another device on condition that the operator inputs a second operation.

The configuration of this electronic device prevents the other device program from being automatically updated without waiting for the user's decision, which makes it possible to avoid a delay due to the program update on the factory line, for example. Further, instead of automatically displaying an error based on a version difference at power on, version information is displayed on condition of an explicit user's operation, which makes it possible to prevent the device from being erroneously determined as defective due to a difference in firmware version.

[Item 3]

The electronic device according to item 2, wherein the getter, in operation, receives, from the another device, version information indicating a version of an own device program stored in the another device, and in response to a version of the own device program stored in the first area being older than the version of the own device program stored in the another device, the updater receives, from the another device, the own device program stored in the another device and updates the own device program stored in the first area using the own device program stored in the another device on condition that the operator inputs a third operation.

The configuration of this electronic device prevents the own device program from being automatically updated without waiting for the user's decision, which makes it possible to avoid a delay due to the program update on the factory line, for example.

[Item 4]

The electronic device according to item 1, wherein the getter, in operation, receives, from the another device, version information indicating a major version and a minor version of the device program stored in the another device, and in response to the major version of the device program stored in the another device being older than a major version of the another device program stored in the second area, the transmitter transmits the another device program stored in the second area to the another device, and in response to the major version of the another device program stored in the second area and the major version of the device program stored in the another device being identical to each other, the transmitter does not transmit the another device program stored in the second area to the another device even if the minor version of the device program stored in the another device is older than a minor version of the another device program stored in the second area.

The configuration of this electronic device prevents the program update that is originally unnecessary, which makes it possible to reduce the user's waiting time.

[Item 5]

The electronic device according to item 4, wherein the getter, in operation, receives, from the another device, version information indicating a major version and a minor version of an own device program stored in the another device, and in response to a major version of the own device program stored in the first area being older than the major version of the own device program stored in the another device, the updater receives, from the another device, the own device program stored in the another device and updates the own device program stored in the first area using the own device program stored in the another device, and in response to the major version of the own device program stored in the another device and the major version of the own device program stored in the first area being identical to each other, the updater does not update the own device program stored in the first area even if a minor version of the own device program stored in the first area is older than the minor version of the own device program stored in the another device.

The configuration of this electronic device prevents the program update that is originally unnecessary, which makes it possible to reduce the user's waiting time.

[Item 6]

The electronic device according to item 1 further including a determiner, wherein the communicator, in operation, communicates with a first other device via a first bus and communicates with a second other device via a second bus different from the first bus, a first other device program specifying an operation of the first other device and a second other device program specifying an operation of the second other device are stored in the second area, the getter, in operation, receives, from the first other device, respective version information of the own device program, the first other device program, and the second other device program stored in the first other device, and receives, from the second other device, respective versions of the own device program, the first other device program, and the second other device program stored in the second other device, and the determiner, in operation, determines a device in which a latest version of program is stored for each of the own device program, the first other device program, and the second other device program, as an update program provider.

The configuration of this electronic device allows a system in which a plurality of electronic devices cooperate with each other via different types of buses to appropriately determine a provider of an update program.

[Item 7]

The electronic device according to item 6, wherein in response to a latest version of the own device program and a latest version of the second other device program are stored in the first other device, the updater receives, from the first other device, the own device program and the second other device program stored in the first other device and updates the own device program stored in the first area, and the transmitter transmits the second other device program received by the updater to the second other device.

The configuration of this electronic device allows a system in which a plurality of electronic devices cooperate with each other via different types of buses to appropriately update a program of each of the devices.

[Item 8]

The electronic device according to any one of items 1 to 7, wherein a version of the own device program stored in the first area and a version of the another device program stored in the second area are identical to each other.

The configuration of this electronic device allows the version of the program stored in the own device and the version of the program stored in the other device to be efficiently compared.

[Item 9]

The electronic device according to item 1, wherein a version of the another device program stored in the second area is compatible with a version of the own device program stored in the first area.

[Item 10]

The electronic device according to item 1, wherein the electronic device is a device mounted on a vehicle.

[Item 11]

The electronic device according to item 10, wherein the another device is a device mounted on the vehicle, and the communicator communicates with the another device via an in-vehicle network.

[Item 12]

A program update method for an electronic device including executing data processing with another device, the electronic device including a storage in which an own device program that is a computer program specifying an operation of the electronic device is stored in a first area in the storage and in which another device program that is a computer program specifying an operation of another device is stored in a second area in the storage, the second area being different from the first area, the data processing with the another device being based on the own device program stored in the first area, receiving, from the another device, version information of a device program stored in the another device, transmitting the another device program stored in the second area to the another device to cause the another device to update the device program stored in the another device in response to the version information of the device program received from the another device satisfying a predetermined condition, and storing, in the second area in place of the another device program stored in the second area, an own device update program that is input from outside the electronic device, and updates the own device program stored in the first area using the own device update program.

This program update method eliminates the need for additionally providing a memory area for storing the other device program in the electronic device, which makes it possible to suppress an increase in the manufacturing cost of the electronic device.

[Item 13]

A computer program product causing an electronic device to execute data processing with the another device, the electronic device including a storage in which an own device program that is a computer program specifying an operation of the electronic device is stored in a first area in the storage and in which another device program that is a computer program specifying an operation of the another device is stored in a second area in the storage, the second area being different from the first area, the data processing with the another device being based on the own device program stored in the first area, receive, from the another device, version information of a device program stored in the another device, transmit the another device program stored in the second area to the another device to cause the another device to update the device program stored in the another device in response to the version information of the device program received from the another device satisfying a predetermined condition, and store, in the second area in place of the another device program stored in the second area, an own device update program that is input from outside the electronic device, and update the own device program stored in the first area using the own device update program.

This computer program product eliminates the need for additionally providing a memory area for storing the other device program in the electronic device, which makes it possible to suppress an increase in the manufacturing cost of the electronic device.

Any combination of the above embodiments and modifications is also effective as an embodiment of the present disclosure. A new embodiment resulting from such a combination exhibits the effect of each of the embodiments and modifications constituting the combination. Further, it is to be understood by those skilled in the art that a function to be fulfilled by each of the components described in the claims can be implemented by one of the components described in the embodiments and the modifications or via cooperation among the components.

What is claimed is:

1. An electronic device, comprising:
    an interface, which, in operation, communicates with another device;
    a memory in which an own device program that is a first computer program specifying an operation of the electronic device is stored in a first area in the memory, and in which another device program that is a second computer program specifying an operation of the another device is stored in a second area in the memory, the second area being different from the first area;
    a data processor, which, in operation, executes data processing with the another device based on the own device program stored in the first area;
    the interface, which, in operation, receives, from the another device, a version of a second another device program stored in the another device;
    a transmitter, which, in operation, transmits the another device program stored in the second area to the another device to cause the another device to update the second another device program stored in the another device in response to the version of the second another device program received from the another device being older than a version of the another device program stored in the second area on condition that an operator inputs an update operation, the update operation being input on a confirmation screen and instructing the second another device program stored in the another device to be updated; and
    an update processor, which, in operation, stores, in the second area in place of the another device program stored in the second area, an own device update program that is input from outside the electronic device, and updates the own device program stored in the first area using the own device update program,
    wherein the interface, in operation, receives, from the another device, a version of a second own device program stored in the another device, and
    in response to a version of the own device program stored in the first area being older than the version of the second own device program stored in the another device, the update processor receives, from the another device, the second own device program stored in the another device and updates the own device program stored in the first area using the second own device program stored in the another device on condition that the operator inputs a second update operation, the second update operation being on the confirmation screen and instructing the own device program stored in the first area to be updated.

2. The electronic device according to claim 1 further comprising:
a display controller, which, in operation, displays version information indicating the version of the another device program stored in the second area and the version of the second another device program received from the another device on condition that the operator inputs a version display operation.

3. The electronic device according to claim 1, wherein
the interface, in operation, receives, from the another device, version information indicating a major version and a minor version of the second another device program stored in the another device, and
in response to the major version of the second another device program stored in the another device being older than a major version of the another device program stored in the second area, the transmitter transmits the another device program stored in the second area to the another device, and
in response to the major version of the another device program stored in the second area and the major version of the second another device program stored in the another device being identical, the transmitter does not transmit the another device program stored in the second area to the another device even if the minor version of the second another device program stored in the another device is older than a minor version of the another device program stored in the second area.

4. The electronic device according to claim 3, wherein
the interface, in operation, receives, from the another device, version information indicating a major version and a minor version of the second own device program stored in the another device, and
in response to a major version of the own device program stored in the first area being older than the major version of the second own device program stored in the another device, the update processor receives, from the another device, the second own device program stored in the another device and updates the own device program stored in the first area using the second own device program stored in the another device, and
in response to the major version of the second own device program stored in the another device and the major version of the own device program stored in the first area being identical, the update processor does not update the own device program stored in the first area even if a minor version of the own device program stored in the first area is older than the minor version of the second own device program stored in the another device.

5. The electronic device according to claim 1, further comprising:
a determination processor, wherein
the interface, in operation, communicates with a first other device via a first bus and communicates with a second other device via a second bus different from the first bus,
a first other device program specifying an operation of the first other device and a second other device program specifying an operation of the second other device are stored in the second area,
the interface, in operation, receives, from the first other device, respective version information of the own device program, the first other device program, and the second other device program stored in the first other device, and receives, from the second other device, respective versions of the own device program, the first other device program, and the second other device program stored in the second other device, and
the determination processor, in operation, determines a device in which a latest version of program is stored for each of the own device program, the first other device program, and the second other device program, as an update program provider.

6. The electronic device according to claim 5, wherein
in response to a latest version of the own device program and a latest version of the second other device program being stored in the first other device,
the update processor receives, from the first other device, the own device program and the second other device program stored in the first other device and updates the own device program stored in the first area, and the transmitter transmits the second other device program received by the update processor to the second other device.

7. The electronic device according to claim 1, wherein
the version of the own device program stored in the first area and the version of the another device program stored in the second area are identical.

8. The electronic device according to claim 1, wherein
the version of the another device program stored in the second area is compatible with the version of the own device program stored in the first area.

9. The electronic device according to claim 1 wherein the electronic device is mounted on a vehicle.

10. The electronic device according to claim 9, wherein
the another device is mounted on the vehicle, and
the interface communicates with the another device via an in-vehicle network.

11. A program update method for an electronic device, the program update method comprising:
executing data processing with another device, the electronic device including a memory in which an own device program that is a first computer program specifying an operation of the electronic device is stored in a first area in the memory and in which another device program that is a second computer program specifying an operation of the another device is stored in a second area in the memory, the second area being different from the first area, the data processing with the another device being based on the own device program stored in the first area;
receiving, from the another device, a version of a second another device program stored in the another device;
transmitting the another device program stored in the second area to the another device to cause the another device to update the second another device program stored in the another device in response to the version of the second another device program received from the another device being older than a version of the another device program stored in the second area on condition that an operator inputs an update operation, the update operation being input on a confirmation screen and instructing the second another device program stored in the another device to be updated;
storing, in the second area in place of the another device program stored in the second area, an own device update program that is input from outside the electronic device, and updating the own device program stored in the first area using the own device update program;

receiving, from the another device, a version of a second own device program stored in the another device; and in response to a version of the own device program stored in the first area being older than the version of the second own device program stored in the another device, receiving, from the another device, the second own device program stored in the another device, and updating the own device program stored in the first area using the second own device program stored in the another device on condition that the operator inputs a second update operation, the second update operation being on the confirmation screen and instructing the own device program stored in the first area to be updated.

12. A non-transitory recording medium having a set of computer readable instruction that, when executed, cause an electronic device to:

execute data processing with another device, the electronic device including a memory in which an own device program that is a first computer program specifying an operation of the electronic device is stored in a first area in the memory and in which another device program that is a second computer program specifying an operation of the another device is stored in a second area in the memory, the second area being different from the first area, the data processing with the another device being based on the own device program stored in the first area;

receive, from the another device, a version of a second another device program stored in the other device;

transmit the another device program stored in the second area to the another device to cause the another device to update the second another device program stored in the another device in response to the version of the second another device program received from the another device being older than a version of the another device program stored in the second area on condition that an operator inputs an update operation, the update operation being input on a confirmation screen and instructing the second another device program stored in the another device to be updated;

store, in the second area in place of the another device program stored in the second area, an own device update program that is input from outside the electronic device, and update the own device program stored in the first area using the own device update program;

receive, from the another device, a version of a second own device program stored in the another device; and in response to a version of the own device program stored in the first area being older than the version of the second own device program stored in the another device, receive, from the another device, the second own device program stored in the another device, and update the own device program stored in the first area using the second own device program stored in the another device on condition that the operator inputs a second update operation, the second update operation being on the confirmation screen and instructing the own device program stored in the first area to be updated.

* * * * *